US008218446B2

(12) United States Patent  
Umayabashi et al.

(10) Patent No.: US 8,218,446 B2  
(45) Date of Patent: Jul. 10, 2012

(54) FRAME TRANSFER ROUTE CONFIRMATION METHOD, NODE, FRAME TRANSFER ROUTE CONFIRMATION PROGRAM AND FRAME TRANSFER ROUTE CONFIRMATION SYSTEM

(75) Inventors: Masaki Umayabashi, Tokyo (JP); Kazuo Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 470 days.

(21) Appl. No.: 12/293,855

(22) PCT Filed: Mar. 27, 2007

(86) PCT No.: PCT/JP2007/057357  
§ 371 (c)(1),  
(2), (4) Date: Oct. 9, 2008

(87) PCT Pub. No.: WO2007/119635  
PCT Pub. Date: Oct. 25, 2007

(65) Prior Publication Data  
US 2009/0122800 A1 May 14, 2009

(30) Foreign Application Priority Data  
Mar. 27, 2006 (JP) ................................. 2006-084761

(51) Int. Cl.  
*H04L 12/56* (2006.01)  
*H04J 1/16* (2006.01)

(52) U.S. Cl. ........ 370/238; 370/252; 370/254; 370/389; 370/401

(58) Field of Classification Search .................. 370/252, 370/237, 238, 254, 389, 401  
See application file for complete search history.

(56) References Cited

U.S. PATENT DOCUMENTS

| 7,143,187 | B1* | 11/2006 | Takeda et al. ................. 709/245 |
| 2002/0150099 | A1* | 10/2002 | Pung et al. ..................... 370/390 |
| 2003/0026241 | A1* | 2/2003 | Ono et al. ...................... 370/349 |
| 2003/0189947 | A1* | 10/2003 | Beshai ............................ 370/428 |
| 2006/0092853 | A1* | 5/2006 | Santoso et al. ................ 370/252 |
| 2011/0164502 | A1* | 7/2011 | Mohan et al. ............... 370/236.2 |

FOREIGN PATENT DOCUMENTS

| JP | 1998303913 A | 11/1998 |
| JP | 2002111665 A | 4/2002 |
| JP | 2003249949 A | 9/2003 |
| JP | 2004147223 A | 5/2004 |
| JP | 2005026902 A | 1/2005 |
| JP | 2007037062 A | 2/2007 |

OTHER PUBLICATIONS

Atsushi Iwamura, Introduction of Detail Mechanism of Ethernet OAM (Y.17ethoam), Technical Report of Ieice CS2004-85, Oct. 21, 2005, pp. 35-40.  
Japanese Office Action for JP2008-510908 issued Apr. 28, 2011.  
International Search Report for PCT/JP2007/057357 mailed May 1, 2007.

* cited by examiner

*Primary Examiner* — John Pezzlo

(57) ABSTRACT

The frame switching unit 630 has the frame analysis unit 700, the frame rewriting unit 710, the frame transfer unit 720, the table search unit 730, the forwarding table 740, the MAC learning unit 750, the control frame distribution unit 760, the setting control unit 790, the STP control unit 780 which, when receiving a topology change message, converts an LT flag from 0 to 1 to indicate an entry as of before switching to leave the entry in the table, and the OAM control unit 770 which, upon an LT execution request before failure switching, transfers an LT frame according an output port in an entry whose LT flag is 1 among entries in the forwarding table 740.

40 Claims, 23 Drawing Sheets

800  MAC TABLE

| MAC ADDRESS | VLAN | LT FLAG | PORT |
|---|---|---|---|
|  |  |  |  |
|  |  |  |  |
|  |  |  |  |
| ⋮ | ⋮ | ⋮ | ⋮ |
|  |  |  |  |
|  |  |  |  |

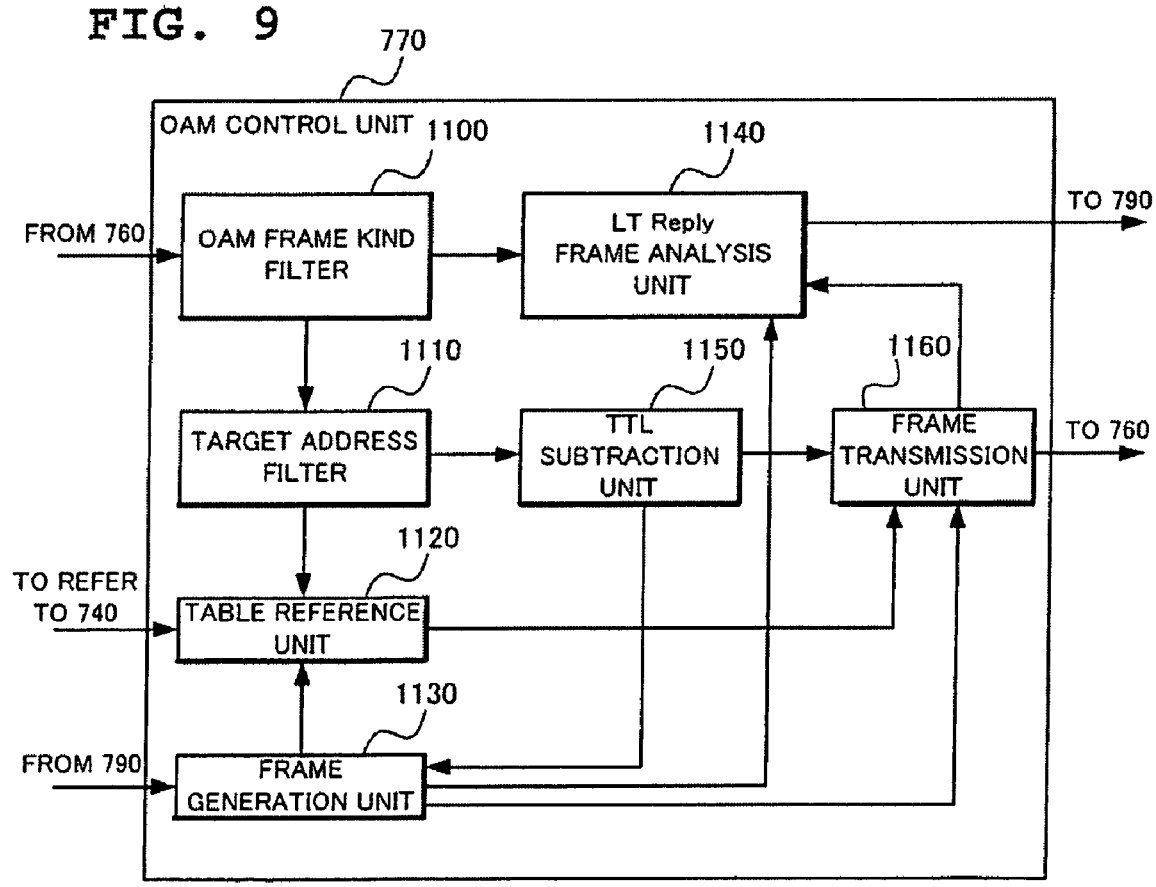

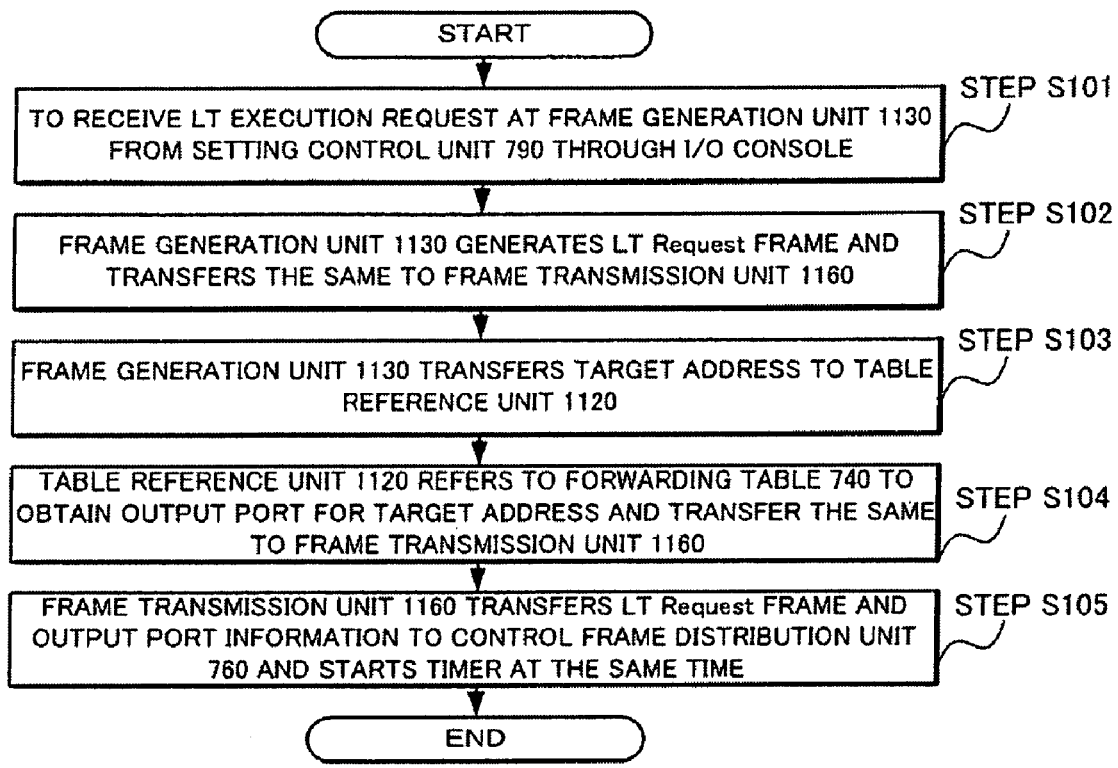
FIG. 11 GENERATION OF LT Request FRAME
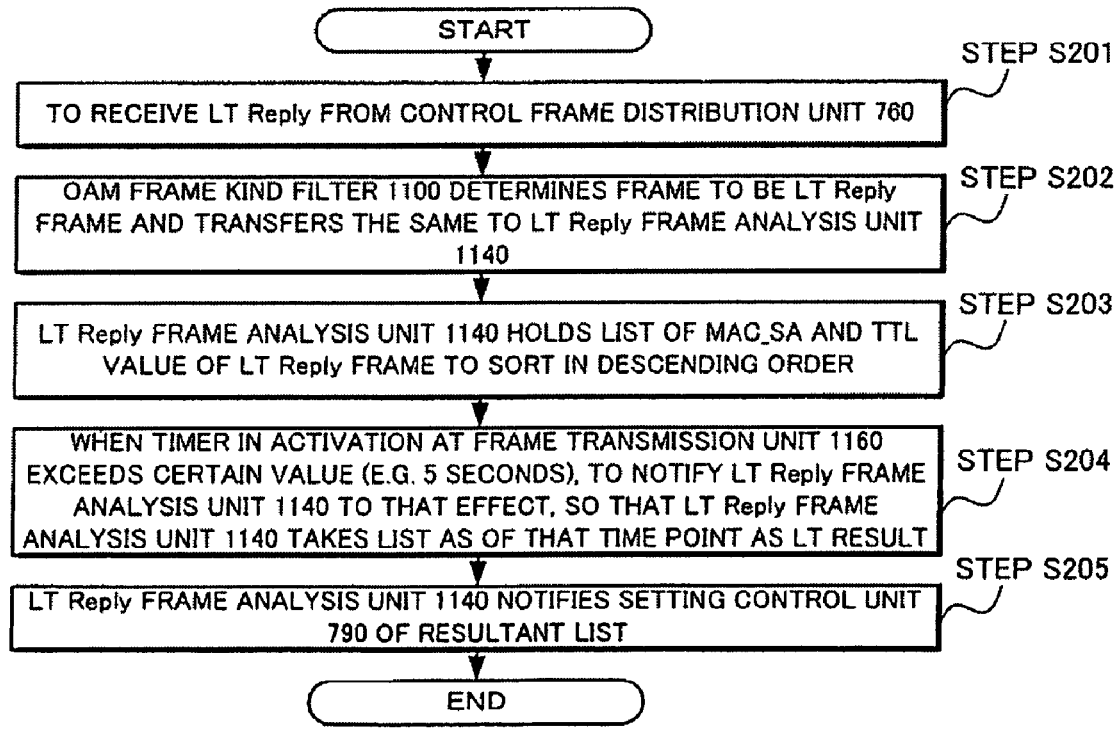
FIG. 12 GENERATION OF LT Reply FRAME (TERMINATION)

FIG. 14

MAC TABLE 800 OF SWITCH S1

| MAC ADDRESS | VLAN | LT FLAG | PORT |
|---|---|---|---|
| t1 | X | 0 | p1 |
| t2 | X | 0 | p2 |
| | | | |
| | | | |

MAC TABLE 800 OF SWITCH S2

| MAC ADDRESS | VLAN | LT FLAG | PORT |
|---|---|---|---|
| t1 | X | 0 | p1 |
| t2 | X | 0 | p2 |
| | | | |
| | | | |

MAC TABLE 800 OF SWITCH S3

| MAC ADDRESS | VLAN | LT FLAG | PORT |
|---|---|---|---|
| t1 | X | 0 | p1 |
| t2 | X | 0 | p2 |
| | | | |
| | | | |

MAC TABLE 800 OF SWITCH S4

| MAC ADDRESS | VLAN | LT FLAG | PORT |
|---|---|---|---|
| t1 | X | 0 | p1 |
| t2 | X | 0 | p2 |
| | | | |
| | | | |

MAC TABLE 800 OF SWITCH S5

| MAC ADDRESS | VLAN | LT FLAG | PORT |
|---|---|---|---|
| t1 | X | 0 | p2 |
| t2 | X | 0 | p1 |
| | | | |
| | | | |

MAC TABLE 800 OF SWITCH S6

| MAC ADDRESS | VLAN | LT FLAG | PORT |
|---|---|---|---|
| t1 | X | 0 | p2 |
| t2 | X | 0 | p2 |
| | | | |
| | | | |

MAC TABLE 800 OF SWITCH S7

| MAC ADDRESS | VLAN | LT FLAG | PORT |
|---|---|---|---|
| t1 | X | 0 | p1 |
| t2 | X | 0 | p1 |
| | | | |
| | | | |

MAC TABLE 800 OF SWITCH S8

| MAC ADDRESS | VLAN | LT FLAG | PORT |
|---|---|---|---|
| t1 | X | 0 | p1 |
| t2 | X | 0 | p1 |
| | | | |
| | | | |

FIG. 16

MAC TABLE 800 OF SWITCH S1

| MAC ADDRESS | VLAN | LT FLAG | PORT |
|---|---|---|---|
| t1 | X | 0 | p1 |
| t2 | X | 1 | p2 |
| | | | |
| | | | |

MAC TABLE 800 OF SWITCH S2

| MAC ADDRESS | VLAN | LT FLAG | PORT |
|---|---|---|---|
| t1 | X | 0 | p1 |
| | | | |
| | | | |
| | | | |

MAC TABLE 800 OF SWITCH S3

| MAC ADDRESS | VLAN | LT FLAG | PORT |
|---|---|---|---|
| t2 | X | 0 | p2 |
| | | | |
| | | | |
| | | | |

MAC TABLE 800 OF SWITCH S4

| MAC ADDRESS | VLAN | LT FLAG | PORT |
|---|---|---|---|
| t1 | X | 1 | p1 |
| t2 | X | 0 | p2 |
| | | | |
| | | | |

MAC TABLE 800 OF SWITCH S5

| MAC ADDRESS | VLAN | LT FLAG | PORT |
|---|---|---|---|
| t1 | X | 1 | p2 |
| t2 | X | 0 | p1 |
| | | | |
| | | | |

MAC TABLE 800 OF SWITCH S6

| MAC ADDRESS | VLAN | LT FLAG | PORT |
|---|---|---|---|
| t1 | X | 1 | p2 |
| t2 | X | 1 | p2 |
| | | | |
| | | | |

MAC TABLE 800 OF SWITCH S7

| MAC ADDRESS | VLAN | LT FLAG | PORT |
|---|---|---|---|
| t1 | X | 1 | p1 |
| t2 | X | 1 | p1 |
| | | | |
| | | | |

MAC TABLE 800 OF SWITCH S8

| MAC ADDRESS | VLAN | LT FLAG | PORT |
|---|---|---|---|
| t1 | X | 1 | p1 |
| t2 | X | 1 | p1 |
| | | | |
| | | | |

FIG. 17

MAC TABLE 800 OF SWITCH S1

| MAC ADDRESS | VLAN | LT FLAG | PORT |
|---|---|---|---|
| t1 | X | 0 | p1 |
| t2 | X | 1 | p2 |
| t2 | X | 0 | p3 |
| | | | |

MAC TABLE 800 OF SWITCH S2

| MAC ADDRESS | VLAN | LT FLAG | PORT |
|---|---|---|---|
| t1 | X | 0 | p1 |
| t2 | X | 0 | p1 |
| | | | |
| | | | |

MAC TABLE 800 OF SWITCH S3

| MAC ADDRESS | VLAN | LT FLAG | PORT |
|---|---|---|---|
| t2 | X | 0 | p2 |
| t1 | X | 0 | p2 |
| | | | |
| | | | |

MAC TABLE 800 OF SWITCH S4

| MAC ADDRESS | VLAN | LT FLAG | PORT |
|---|---|---|---|
| t1 | X | 1 | p1 |
| t2 | X | 0 | p2 |
| t1 | X | 0 | p2 |
| | | | |

MAC TABLE 800 OF SWITCH S5

| MAC ADDRESS | VLAN | LT FLAG | PORT |
|---|---|---|---|
| t1 | X | 1 | p2 |
| t2 | X | 0 | p1 |
| t1 | X | 0 | p3 |
| | | | |

MAC TABLE 800 OF SWITCH S6

| MAC ADDRESS | VLAN | LT FLAG | PORT |
|---|---|---|---|
| t1 | X | 1 | p2 |
| t2 | X | 1 | p2 |
| t1 | X | 0 | p1 |
| t2 | X | 0 | p2 |

MAC TABLE 800 OF SWITCH S7

| MAC ADDRESS | VLAN | LT FLAG | PORT |
|---|---|---|---|
| t1 | X | 1 | p1 |
| t2 | X | 1 | p1 |
| t1 | X | 0 | p1 |
| t2 | X | 0 | p2 |

MAC TABLE 800 OF SWITCH S8

| MAC ADDRESS | VLAN | LT FLAG | PORT |
|---|---|---|---|
| t1 | X | 1 | p1 |
| t2 | X | 1 | p1 |
| t1 | X | 0 | p1 |
| t2 | X | 0 | p2 |

FIG. 19 2000 MAC TABLE

| MAC ADDRESS | VLAN | PORT |
|---|---|---|
|  |  |  |
|  |  |  |
|  |  |  |
| . | . | . |
|  |  |  |
|  |  |  |

BEFORE TOPOLOGY CHANGE MESSAGE IS RECEIVED

AFTER RECEPTION

MAC ADDRESS: 6 Byte

FIG. 22

MAC TABLE 2000 OF SWITCH S1

| MAC ADDRESS | VLAN | PORT |
|---|---|---|
| 0x 00 00 4c 00 00 01 | X | p1 |
| 0x 00 00 4c 00 00 02 | X | p2 |
| | | |
| | | |

MAC TABLE 2000 OF SWITCH S2

| MAC ADDRESS | VLAN | PORT |
|---|---|---|
| 0x 00 00 4c 00 00 01 | X | p1 |
| 0x 00 00 4c 00 00 02 | X | p2 |
| | | |
| | | |

MAC TABLE 2000 OF SWITCH S3

| MAC ADDRESS | VLAN | PORT |
|---|---|---|
| 0x 00 00 4c 00 00 01 | X | p1 |
| 0x 00 00 4c 00 00 02 | X | p2 |
| | | |
| | | |

MAC TABLE 2000 OF SWITCH S4

| MAC ADDRESS | VLAN | PORT |
|---|---|---|
| 0x 00 00 4c 00 00 01 | X | p1 |
| 0x 00 00 4c 00 00 02 | X | p2 |
| | | |
| | | |

MAC TABLE 2000 OF SWITCH S5

| MAC ADDRESS | VLAN | PORT |
|---|---|---|
| 0x 00 00 4c 00 00 01 | X | p2 |
| 0x 00 00 4c 00 00 02 | X | p1 |
| | | |
| | | |

MAC TABLE 2000 OF SWITCH S6

| MAC ADDRESS | VLAN | PORT |
|---|---|---|
| 0x 00 00 4c 00 00 01 | X | p2 |
| 0x 00 00 4c 00 00 02 | X | p2 |
| | | |
| | | |

MAC TABLE 2000 OF SWITCH S7

| MAC ADDRESS | VLAN | PORT |
|---|---|---|
| 0x 00 00 4c 00 00 01 | X | p1 |
| 0x 00 00 4c 00 00 02 | X | p1 |
| | | |
| | | |

MAC TABLE 2000 OF SWITCH S8

| MAC ADDRESS | VLAN | PORT |
|---|---|---|
| 0x 00 00 4c 00 00 01 | X | p1 |
| 0x 00 00 4c 00 00 02 | X | p1 |
| | | |
| | | |

FIG. 23

MAC TABLE 2000 OF SWITCH S1

| MAC ADDRESS | VLAN | PORT |
|---|---|---|
| 0x 00 00 4c 00 00 01 | X | p1 |
| 0x 01 00 4c 00 00 02 | X | p2 |
| | | |
| | | |

MAC TABLE 2000 OF SWITCH S2

| MAC ADDRESS | VLAN | PORT |
|---|---|---|
| 0x 00 00 4c 00 00 01 | X | p1 |
| | | |
| | | |
| | | |

MAC TABLE 2000 OF SWITCH S3

| MAC ADDRESS | VLAN | PORT |
|---|---|---|
| 0x 00 00 4c 00 00 02 | X | p2 |
| | | |
| | | |
| | | |

MAC TABLE 2000 OF SWITCH S4

| MAC ADDRESS | VLAN | PORT |
|---|---|---|
| 0x 01 00 4c 00 00 01 | X | p1 |
| 0x 00 00 4c 00 00 02 | X | p2 |
| | | |
| | | |

MAC TABLE 2000 OF SWITCH S5

| MAC ADDRESS | VLAN | PORT |
|---|---|---|
| 0x 01 00 4c 00 00 01 | X | p2 |
| 0x 00 00 4c 00 00 02 | X | p1 |
| | | |
| | | |

MAC TABLE 2000 OF SWITCH S6

| MAC ADDRESS | VLAN | PORT |
|---|---|---|
| 0x 01 00 4c 00 00 01 | X | p2 |
| 0x 01 00 4c 00 00 02 | X | p2 |
| | | |
| | | |

MAC TABLE 2000 OF SWITCH S7

| MAC ADDRESS | VLAN | PORT |
|---|---|---|
| 0x 01 00 4c 00 00 01 | X | p1 |
| 0x 01 00 4c 00 00 02 | X | p1 |
| | | |
| | | |

MAC TABLE 2000 OF SWITCH S8

| MAC ADDRESS | VLAN | PORT |
|---|---|---|
| 0x 01 00 4c 00 00 01 | X | p1 |
| 0x 01 00 4c 00 00 02 | X | p1 |
| | | |
| | | |

FIG. 24

MAC TABLE 2000 OF SWITCH S1

| MAC ADDRESS | VLAN | PORT |
|---|---|---|
| 0x 00 00 4c 00 00 01 | X | p1 |
| 0x 01 00 4c 00 00 02 | X | p2 |
| 0x 00 00 4c 00 00 02 | X | p3 |
| | | |

MAC TABLE 2000 OF SWITCH S2

| MAC ADDRESS | VLAN | PORT |
|---|---|---|
| 0x 00 00 4c 00 00 01 | X | p1 |
| 0x 00 00 4c 00 00 02 | X | p1 |
| | | |
| | | |

MAC TABLE 2000 OF SWITCH S3

| MAC ADDRESS | VLAN | PORT |
|---|---|---|
| 0x 00 00 4c 00 00 02 | X | p2 |
| 0x 00 00 4c 00 00 01 | X | p2 |
| | | |
| | | |

MAC TABLE 2000 OF SWITCH S4

| MAC ADDRESS | VLAN | PORT |
|---|---|---|
| 0x 01 00 4c 00 00 01 | X | p1 |
| 0x 00 00 4c 00 00 02 | X | p2 |
| 0x 00 00 4c 00 00 01 | X | p2 |
| | | |

MAC TABLE 2000 OF SWITCH S5

| MAC ADDRESS | VLAN | PORT |
|---|---|---|
| 0x 01 00 4c 00 00 01 | X | p2 |
| 0x 00 00 4c 00 00 02 | X | p1 |
| 0x 00 00 4c 00 00 01 | X | p3 |
| | | |

MAC TABLE 2000 OF SWITCH S6

| MAC ADDRESS | VLAN | PORT |
|---|---|---|
| 0x 01 00 4c 00 00 01 | X | p2 |
| 0x 01 00 4c 00 00 02 | X | p2 |
| 0x 00 00 4c 00 00 01 | X | p1 |
| 0x 00 00 4c 00 00 02 | X | p2 |

MAC TABLE 2000 OF SWITCH S7

| MAC ADDRESS | VLAN | PORT |
|---|---|---|
| 0x 01 00 4c 00 00 01 | X | p1 |
| 0x 01 00 4c 00 00 02 | X | p1 |
| 0x 00 00 4c 00 00 01 | X | p1 |
| 0x 00 00 4c 00 00 02 | X | p2 |

MAC TABLE 2000 OF SWITCH S8

| MAC ADDRESS | VLAN | PORT |
|---|---|---|
| 0x 01 00 4c 00 00 01 | X | p1 |
| 0x 01 00 4c 00 00 02 | X | p1 |
| 0x 00 00 4c 00 00 01 | X | p1 |
| 0x 00 00 4c 00 00 02 | X | p2 |

FIG. 25
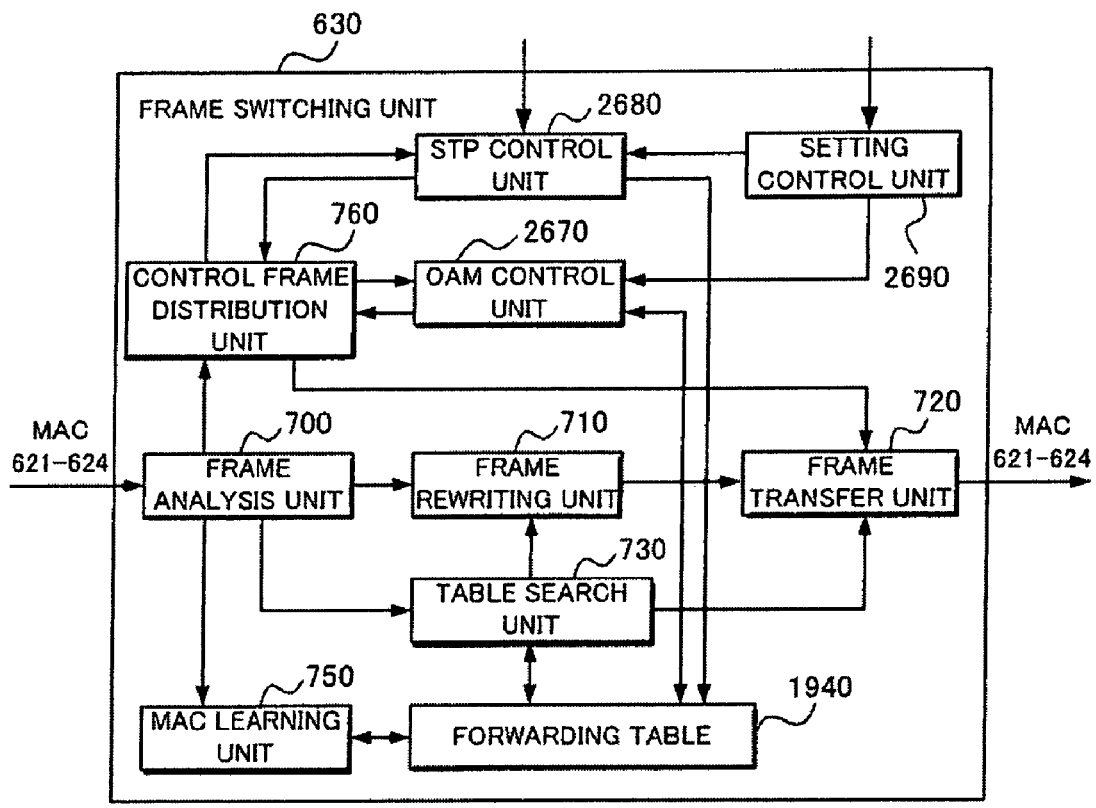
FIG. 26
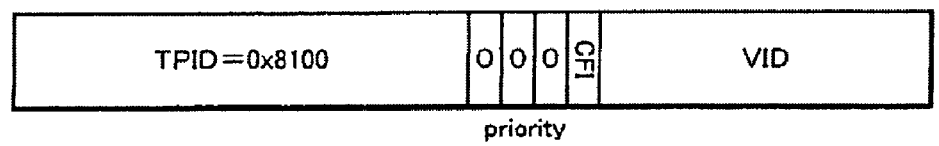
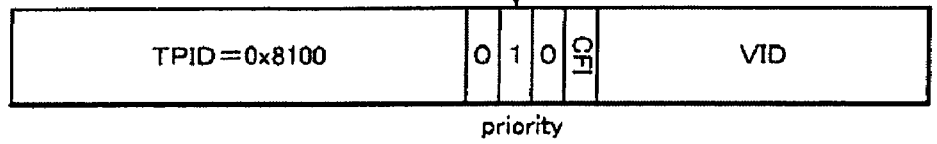

FIG. 28

MAC TABLE 2000 OF SWITCH S1

| MAC ADDRESS | VLAN | PORT |
|---|---|---|
| t1 | 0000 0000 0000 0001 | p1 |
| t2 | 0000 0000 0000 0001 | p2 |
| | | |
| | | |

MAC TABLE 2000 OF SWITCH S2

| MAC ADDRESS | VLAN | PORT |
|---|---|---|
| t1 | 0000 0000 0000 0001 | p1 |
| t2 | 0000 0000 0000 0001 | p2 |
| | | |
| | | |

MAC TABLE 2000 OF SWITCH S3

| MAC ADDRESS | VLAN | PORT |
|---|---|---|
| t1 | 0000 0000 0000 0001 | p1 |
| t2 | 0000 0000 0000 0001 | p2 |
| | | |
| | | |

MAC TABLE 2000 OF SWITCH S4

| MAC ADDRESS | VLAN | PORT |
|---|---|---|
| t1 | 0000 0000 0000 0001 | p1 |
| t2 | 0000 0000 0000 0001 | p2 |
| | | |
| | | |

MAC TABLE 2000 OF SWITCH S5

| MAC ADDRESS | VLAN | PORT |
|---|---|---|
| t1 | 0000 0000 0000 0001 | p2 |
| t2 | 0000 0000 0000 0001 | p1 |
| | | |
| | | |

MAC TABLE 2000 OF SWITCH S6

| MAC ADDRESS | VLAN | PORT |
|---|---|---|
| t1 | 0000 0000 0000 0001 | p2 |
| t2 | 0000 0000 0000 0001 | p2 |
| | | |
| | | |

MAC TABLE 2000 OF SWITCH S7

| MAC ADDRESS | VLAN | PORT |
|---|---|---|
| t1 | 0000 0000 0000 0001 | p1 |
| t2 | 0000 0000 0000 0001 | p1 |
| | | |
| | | |

MAC TABLE 2000 OF SWITCH S8

| MAC ADDRESS | VLAN | PORT |
|---|---|---|
| t1 | 0000 0000 0000 0001 | p1 |
| t2 | 0000 0000 0000 0001 | p1 |
| | | |
| | | |

FIG. 29

MAC TABLE 2000 OF SWITCH S1

| MAC ADDRESS | VLAN | PORT |
|---|---|---|
| t1 | 0000 0000 0000 0001 | p1 |
| t2 | 0100 0000 0000 0001 | p2 |
|  |  |  |
|  |  |  |

MAC TABLE 2000 OF SWITCH S2

| MAC ADDRESS | VLAN | PORT |
|---|---|---|
| t1 | 0000 0000 0000 0001 | p1 |
|  |  |  |
|  |  |  |
|  |  |  |

MAC TABLE 2000 OF SWITCH S3

| MAC ADDRESS | VLAN | PORT |
|---|---|---|
| t2 | 0000 0000 0000 0001 | p2 |
|  |  |  |
|  |  |  |
|  |  |  |

MAC TABLE 2000 OF SWITCH S4

| MAC ADDRESS | VLAN | PORT |
|---|---|---|
| t1 | 0100 0000 0000 0001 | p1 |
| t2 | 0000 0000 0000 0001 | p2 |
|  |  |  |
|  |  |  |

MAC TABLE 2000 OF SWITCH S5

| MAC ADDRESS | VLAN | PORT |
|---|---|---|
| t1 | 0100 0000 0000 0001 | p2 |
| t2 | 0000 0000 0000 0001 | p1 |
|  |  |  |
|  |  |  |

MAC TABLE 2000 OF SWITCH S6

| MAC ADDRESS | VLAN | PORT |
|---|---|---|
| t1 | 0100 0000 0000 0001 | p2 |
| t2 | 0100 0000 0000 0001 | p2 |
|  |  |  |
|  |  |  |

MAC TABLE 2000 OF SWITCH S7

| MAC ADDRESS | VLAN | PORT |
|---|---|---|
| t1 | 0100 0000 0000 0001 | p1 |
| t2 | 0100 0000 0000 0001 | p1 |
|  |  |  |
|  |  |  |

MAC TABLE 2000 OF SWITCH S8

| MAC ADDRESS | VLAN | PORT |
|---|---|---|
| t1 | 0100 0000 0000 0001 | p1 |
| t2 | 0100 0000 0000 0001 | p1 |
|  |  |  |
|  |  |  |

FIG. 30

MAC TABLE 2000 OF SWITCH S1

| MAC ADDRESS | VLAN | PORT |
|---|---|---|
| t1 | 0000 0000 0000 0001 | p1 |
| t2 | 0100 0000 0000 0001 | p2 |
| t2 | 0000 0000 0000 0001 | p3 |
| | | |

MAC TABLE 2000 OF SWITCH S2

| MAC ADDRESS | VLAN | PORT |
|---|---|---|
| t1 | 0000 0000 0000 0001 | p1 |
| t2 | 0000 0000 0000 0001 | p1 |
| | | |
| | | |

MAC TABLE 2000 OF SWITCH S3

| MAC ADDRESS | VLAN | PORT |
|---|---|---|
| t2 | 0000 0000 0000 0001 | p2 |
| t1 | 0000 0000 0000 0001 | p2 |
| | | |
| | | |

MAC TABLE 2000 OF SWITCH S4

| MAC ADDRESS | VLAN | PORT |
|---|---|---|
| t1 | 0100 0000 0000 0001 | p1 |
| t2 | 0000 0000 0000 0001 | p2 |
| t1 | 0000 0000 0000 0001 | p2 |
| | | |

MAC TABLE 2000 OF SWITCH S5

| MAC ADDRESS | VLAN | PORT |
|---|---|---|
| t1 | 0100 0000 0000 0001 | p2 |
| t2 | 0000 0000 0000 0001 | p1 |
| t1 | 0000 0000 0000 0001 | p3 |
| | | |

MAC TABLE 2000 OF SWITCH S6

| MAC ADDRESS | VLAN | PORT |
|---|---|---|
| t1 | 0100 0000 0000 0001 | p2 |
| t2 | 0100 0000 0000 0001 | p2 |
| t1 | 0000 0000 0000 0001 | p1 |
| t2 | 0000 0000 0000 0001 | p2 |

MAC TABLE 2000 OF SWITCH S7

| MAC ADDRESS | VLAN | PORT |
|---|---|---|
| t1 | 0100 0000 0000 0001 | p1 |
| t2 | 0100 0000 0000 0001 | p1 |
| t1 | 0000 0000 0000 0001 | p1 |
| t2 | 0000 0000 0000 0001 | p2 |

MAC TABLE 2000 OF SWITCH S8

| MAC ADDRESS | VLAN | PORT |
|---|---|---|
| t1 | 0100 0000 0000 0001 | p1 |
| t2 | 0100 0000 0000 0001 | p1 |
| t1 | 0000 0000 0000 0001 | p1 |
| t2 | 0000 0000 0000 0001 | p2 |

FRAME TRANSFER ROUTE CONFIRMATION METHOD, NODE, FRAME TRANSFER ROUTE CONFIRMATION PROGRAM AND FRAME TRANSFER ROUTE CONFIRMATION SYSTEM

TECHNICAL FIELD

The present invention relates to frame transfer in a communication network and, more particularly, a frame transfer route confirming method on a frame transfer route, a node, a frame transfer route confirmation program and a frame transfer route confirmation system.

BACKGROUND ART

In recent years, drawing attention as reasonable data services for corporate use is wide area Ethernet VPN (Virtual Private Network) service (wide area Ether) which is an expansion of Ethernet techniques widely used in LAN (Local Area Network) to a wide area network (WAN). Although WAN requires an Operations, Administration and Maintenance (OAM) function, Ethernet techniques used in LAN originally fail to have an OAM function, which is a problem to be solved. Under these circumstances, some of standardization groups in recent years proceed with standardization related to OAM functions in the Ethernet techniques.

One of representative OAM functions is the Trace-route function widely used as one of OAM functions in the Internet. The Trace-route function is used for obtaining information about devices located before reaching a certain target device.

As a method of obtaining information of devices located before reaching a target device in the related art, one example of which is recited in Japanese Patent Laying-Open No. 2004-147223 (Patent Literature 1), description will be made of the Trace-route function (hereinafter, referred to as Link Trace (LT) after naming of ITU-T Y.17ethoam) in ITU-T Y.17ethoam for which standardization of the Ethernet OAM techniques is in progress with reference to FIG. 33. FIG. 33 shows a case where a terminal T2 executes LT for checking information about devices located before reaching a terminal T1. A network shown in FIG. 33 is an existing layer 2 (L2) network for executing MAC (Media Access Control) address learning based frame transfer on topology by STP (Spanning Tree Protocol)/RSTP (Rapid Spanning Tree Protocol) (a link between existing switches LS6 and LS7 is a blocking link). Letter t1 or t2 indicated at a port of existing switches LS1 through LS8 shows MAC address learning condition. In a standard method of ITU-T Y.17ethoam, a Request frame with a TTL (Time to Live) value stored is transmitted to a target device and a Reply frame with the TTL value subtracted by 1 is returned to a transmission source by a relay node and the target device, so that the transmission source executes rearrangement based on the TTL values of the Reply frames to obtain information about devices located before reaching the target device.

Description will be specifically made of execution of LT by the terminal T2 for checking information about devices located before reaching the terminal T1. The terminal T2 as a transmission source transmits an LT Request frame (here, an initial value of TTL is set to be 255). The existing switch LS5 which is a relay node having received the frame transfers a request frame with the TTL value subtracted by 1 (TTL=254) to a port having learned MAC#t1, a MAC address of the terminal T1 as a target device, as well as returning an LT Reply frame with the TTL value stored to the Request issuing source device. Similarly to the existing switch LS5, the existing switch LS4 as a relay node at a stage subsequent to the existing switch LS5 transfers a Request frame with the TTL value subtracted by 1 (TTL=253) to a port having learned MAC#t1, the MAC address of the terminal T1 as a target device, as well as returning an LT Reply frame with the TTL value stored to the Request issuing source device. Relay node existing switches LS3, LS2 and LS1 to follow execute the same operation. Thereafter, when the LT Request frame arrives at the terminal T1 as a target device, the terminal T1, upon reception of the LT Request frame directed to its own device, abandons the LT Request frame to return an LT Reply frame (TTL=249) with the TTL value subtracted by 1 stored to the Request issuing source device. Upon receiving the LT Reply frames from the existing switches LS1 through LS5 as relay nodes and the terminal T1 as a target, the terminal T2 as the Request issuing source device rearranges Relay frame transmission sources based on the stored TTL values to obtain LS5->LS4->LS3->LS2->LS1->T1 as the information about devices located before reaching the target device.

Patent Literature 1: Japanese Patent Laying-Open No. 2004-147223

As described in the foregoing, however, while in the existing LT, a transfer route in a normal state can be confirmed, a failing part at the time of a failure can not be specified.

The problem to be solved will be described with reference to FIG. 34. Also shown in FIG. 34, similarly to FIG. 33, is LT from the terminal T2 (MAC#t2) to the terminal T1 (MAC#t1). Illustrated in FIG. 34(1) is a normal transfer state, in which a link between the existing switches LS6 and LS7 is a blocking link. In addition, each node learns the MAC#t1 and the MAC#t2 by frame transfer between the terminal T1 and the terminal T2. When executing LT from the terminal T2 to the terminal T1 here, a result of the LT is obtained along the route having learned the MAC#t1, a route LS5->LS4->LS3->LS2->LS1->T1 as has described with reference to FIG. 33. When there occurs here a failure on a link between the existing switches LS2 and LS3 as shown in FIG. 34(2), STP/RSTP is restructured to make the link between the existing switches LS6 and LS7 be an active link. Thereafter, as shown in FIG. 34(3), a learned MAC address entry (an entry indicated by ○ in the figure) at a port having received a topology change message in the course of restructuring of STP/RSTP is flushed. Thereafter, when frame transfer between the MAC#t1 and the MAC#t2 is resumed, in each node, each port on a route as of after switching relearns each MAC address (an entry indicated by □ in the figure) as shown in FIG. 34(4). As a result, execution of LT from the terminal T2 to the terminal T1 obtains a route LS5->LS6->LS7->LS8->LS1->T1 based on a new learning result related to the terminal T1 (MAC#t1). The route obtained here is a transfer route as of after route switching and is not a transfer route attaining an object of specifying a failing part on a route as of before switching. For specifying a failing part, it is demanded to have a Reply returned from nodes preceding to the failing part on the route as of before switching. In an ordinary layer 2 network, however, when a route is switched to a new transfer route after failure occurrence, a MAC address entry as of before the switching is flushed to execute LT according to a MAC address entry learned on the new transfer route as of after switching, so that it is impossible to execute LT on the route as of before switching to specify a failing part.

An object of the present invention is to provide a frame transfer route confirmation method, a node, a program thereof and a frame transfer route confirmation system which enables a route as of after route switching to be specified when a failure occurs, as well as enabling a route to a node immediately preceding to a failure occurrence part on a route as of before the route switching node to be specified, thereby specifying a failing part.

SUMMARY

According to an exemplary aspect of the invention, a frame transfer route confirmation method of a network for transferring a data frame transmitted from a transmission source terminal to a destination terminal, comprising the steps of when changing a network structure, applying identification information to an address whose output destination is to be changed in a forwarding table to leave the address, and transferring the request message based on the address left with the identification information applied to confirm a route.

According to the present invention, after a network structure change, a route can be confirmed for an address whose output destination is changed in a forwarding table based on an address as of before the network structure change.

When a failure occurs, the present invention enables a route to a node immediately preceding to the failure occurrence part on a route as of before route switching to be specified and enables a failing part to be specified.

The reason is that since at the network structure change, applying identification information to an address whose output destination is to be changed in a forwarding table to leave the address and transferring a request message based on the address left with the identification information applied, thereby confirming a route, route confirmation is possible after the network structure change for the address whose output destination is to be changed in the forwarding table based on the address as of before the network structure change.

BRIEF DESCRIPTION OF THE DRAWINGS

FIG. 8 is a VLAN table according to the first exemplary embodiment;

FIG. 9 is a diagram showing a structure of an OAM controller according to the first exemplary embodiment;

FIG. 11 is a processing flow at the time of generating an LT Request frame by the OAM control unit according to the first exemplary embodiment;

FIG. 12 is a processing flow at the time of receiving an LT Reply frame by the OAM control unit according to the first exemplary embodiment;

FIG. 14 is a MAC table according to the first exemplary embodiment;

FIG. 16 is a MAC table as of immediately after failure occurrence according to the first exemplary embodiment;

FIG. 17 is a MAC table as of after frame transfer is resumed according to the first exemplary embodiment;

FIG. 19 is a MAC table according to the second exemplary embodiment;

FIG. 22 is a MAC table according to the second exemplary embodiment;

FIG. 23 is a MAC table as of immediately after failure occurrence according to the second exemplary embodiment;

FIG. 24 is a MAC table as of after frame transfer is resumed according to the second exemplary embodiment;

FIG. 25 is a diagram showing a structure of a frame switching unit according to a third exemplary embodiment of the present invention;

FIG. 26 is a diagram showing an example of address conversion of a target address according to the third exemplary embodiment;

FIG. 28 is a MAC table according to the third exemplary embodiment;

FIG. 29 is a diagram showing a MAC table as of immediately after failure occurrence according to the third exemplary embodiment;

FIG. 30 is a MAC table as of after frame transfer is resumed according to the third exemplary embodiment;

EXEMPLARY EMBODIMENT (First Exemplary Embodiment)

In the following, a first exemplary embodiment of the present invention will be detailed with reference to the drawings. Although the present exemplary embodiment will be described with respect to functions of the present invention based on LT techniques in ITU-T Y.17ethoam described in the Background Art, application of the functions of the present invention is also possible based on, for example, LT techniques or the like in which a Trace-route function in the Internet is applied to the Ethernet techniques.

(Structure of First Exemplary Embodiment)

Figure 1:
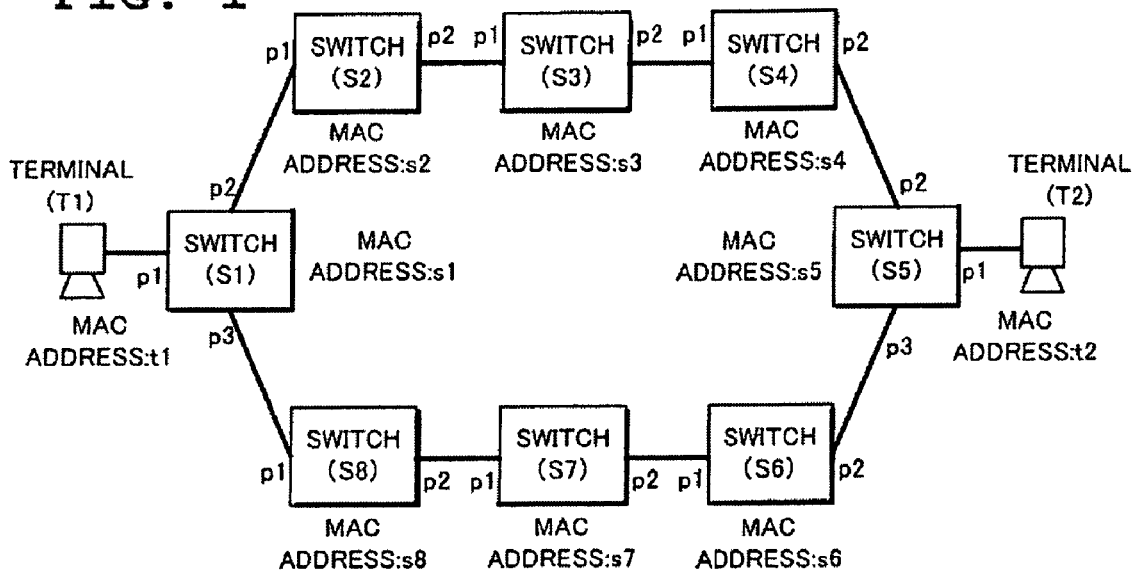
FIG. 1 is a diagram showing a network model according to a first exemplary embodiment of the present invention.

FIG. 1 shows an example of a physical network structure according to the first exemplary embodiment to which the present invention is applied.

Switches S1 through S8 in FIG. 1 have the functions according to the present invention in addition to the existing Ethernet functions. The respective switches are connected in the following manner:

between a port p2 of the switch S1 and a port p1 of the switch S2, between a port p2 of the switch S2 and a port p1 of the switch S3, between a port p2 of the switch S3 and a port p1 of the switch S4, between a port p2 of the switch S4 and a port p2 of the switch S5, between a port p3 of the switch S5 and a port p2 of the switch S6, between a port p1 of the switch S6 and a port p2 of the switch S7, between a port p1 of the switch S7 and a port p2 of the switch S8, and between a port p1 of the switch S8 and a port p3 of the switch S1.

The switches S1 and S5 are connected to user terminals in the following manner:

between a port p1 of the switch S1 and a user terminal T1, and between a port p1 of the switch S5 and a user terminal T2.

Figure 2:
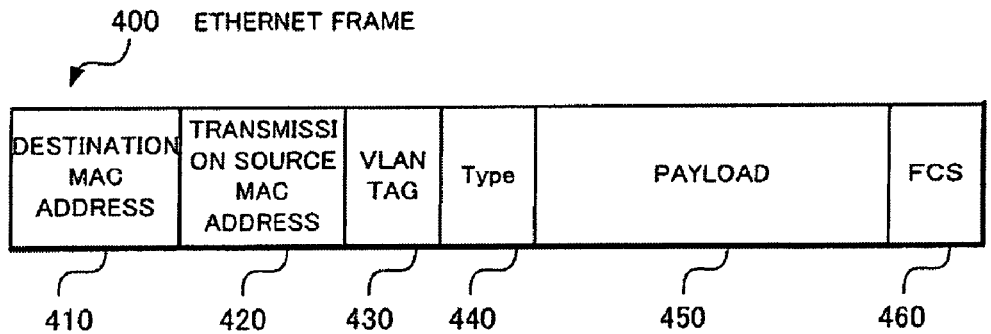
FIG. 2 is a diagram showing a format of an Ethernet frame according the first exemplary embodiment.
Figure 3:
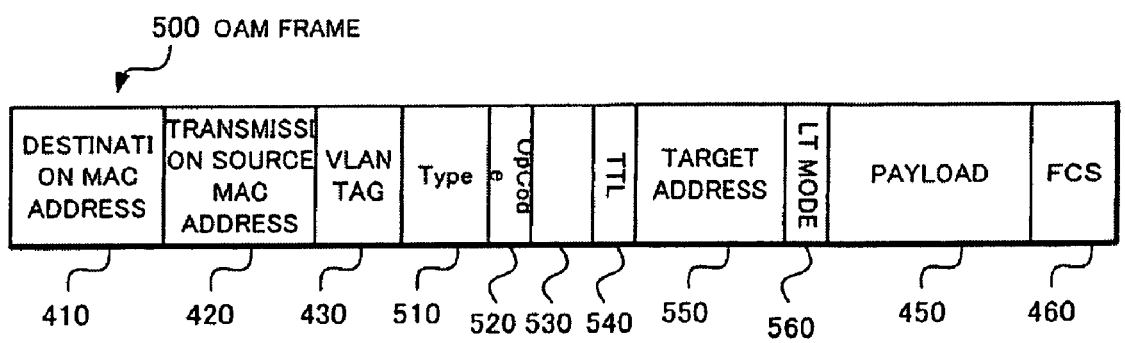
FIG. 3 is a diagram showing a format of an Ethernet OAM frame according the first exemplary embodiment.

With reference to FIG. 2 and FIG. 3, a frame format according to the present exemplary embodiment will be described.

FIG. 2 shows a format of an Ethernet frame 400.

The Ethernet frame 400 is formed of a destination MAC address 410, a transmission source MAC address 420, a VLAN tag 430, Type 440, a payload 450 and an FCS (Frame Check Sequence) 460.

FIG. 3 shows a format of an OAM frame.

In an OAM frame 500, in comparison to the Ethernet frame 400, after the VLAN tag 430, a Type field is changed to Type 510 and inserted are an OpCode 520, a Transaction Identifier (TID) 530, TTL 540, a target address 550 and an LT mode 560.

Although related to FIG. 2 and FIG. 3, there is a case where the VLAN tag 430 is not added, description of the present specification will be made premised on that the VLAN tag 430 is added.

Stored in the Type 510 is a Type value dedicated to OAM, stored in the OpCode 520 is a value of a kind of OAM frame (although in the present specification, only LT control is targeted, a kind of OAM of an OAM frame is defined by a value of this field because OAM control except for LT is supported in practice), stored in the Transaction Identifier (TID) 530 is an OAM control executing ID, stored in the TTL 540 is a TTL value, stored in the target address 550 is an address of an LT target device and stored in the LT mode 560 is a value indicating a normal mode or a failure switching mode at the time of executing LT (the normal mode and the failure switching mode will be described later).

Although in the standardization related to Ethernet OAM, such fields as a Version field (in which a version of OAM is stored) and an ME level field (in which a level value of a management entity of OAM is stored) are defined other than those described above, description will be made of the present specification with only a field necessary for LT control recited.

Next, structure of the switches S1 through S8 will be described with reference to FIG. 4.

Figure 4:
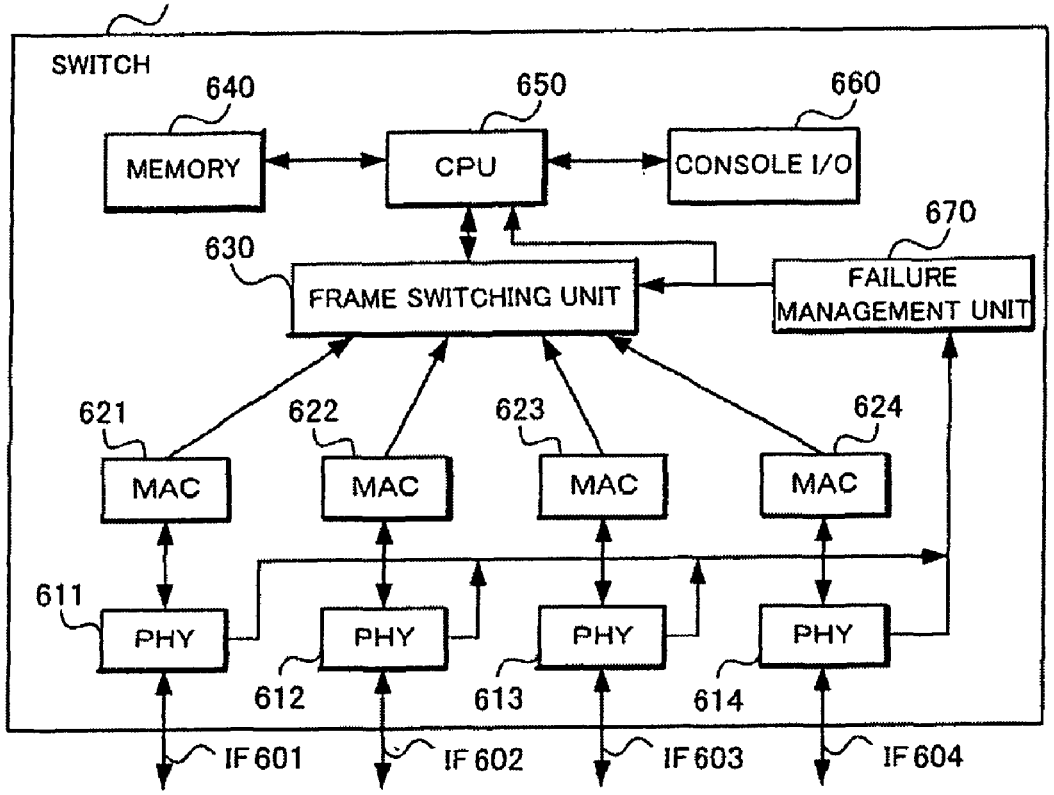
FIG. 4 is a diagram showing a structure of a switch according to the first exemplary embodiment.

A switch 600 shown in FIG. 4 is formed of PHY 611, 612, 613 and 614, MAC 621, 622, 623, 624, a frame switching unit 630, a memory 640, a CPU 650, a console I/O 660 and a failure management unit 670.

To IF 601, 602, 603 and 604, the PHY 611, 612, 613 and 614 are connected, to the PHY 611, 612, 613 and 614, the MAC 621, 622, 623 and 624 are connected, and to the MAC 621, 622, 623 and 624, the frame switching unit 630 is connected.

Ethernet frames input from the IF 601, 602, 603 and 604 are applied to the frame switching unit 630 through the PHY 611, 612, 613 and 614 and the MAC 621, 622, 623, 624, have an appropriate output IF determined at the frame switching unit 630 by the operation which will be described later and are output to the IF 601, 602, 603 and 604 through the MAC 621, 622, 623, and 634 and the PHY 611, 612, 613 and 614, respectively.

The PHY 611, 612, 613 and 614 have a function of notifying, when detecting a failure on the connected IF 601, 602, 603 and 604, the failure management unit 670 of failure information.

The failure management unit 670 has a function of managing a state (normal/failing) of each IF and upon receiving failure information from the PHY 611, 612, 613 and 614, notifying either or both of the frame switching unit 630 and the CPU 650 of failure occurrence.

The CPU 650 and the memory 640 have a function of storing program for controlling operation of the frame switching unit 630 and necessary data and instructing the frame switching unit 630 on control.

The console I/O 660 is an external interface related to setting of the respective units of the device.

Figure 5:
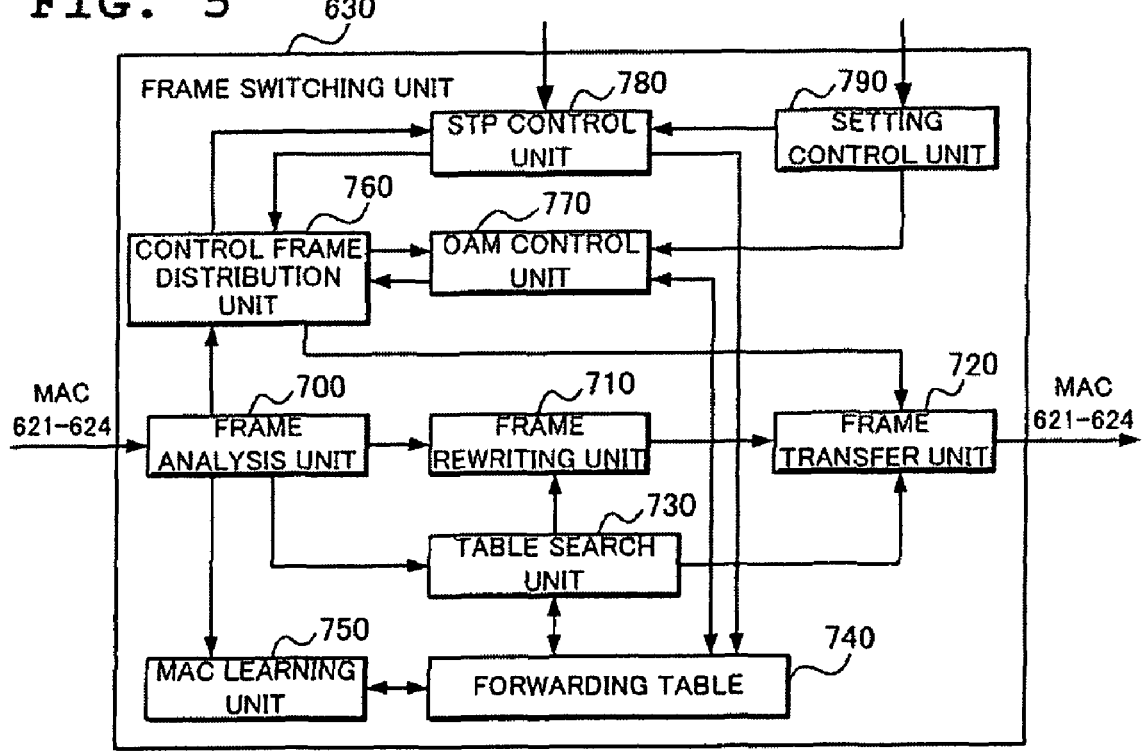
FIG. 5 is a diagram showing a structure of a frame switching unit according to the first exemplary embodiment.

FIG. 5 shows a detailed structure of the frame switching unit 630.

The frame switching unit 630 is formed of a frame analysis unit 700, a frame rewriting unit 710, a frame transfer unit 720, a table search unit 730, a forwarding table 740, a MAC learning unit 750, a control frame distribution unit 760, an OAM control unit 770, an STP control unit 780 and a setting control unit 790.

The frame switching unit 630 has a function of determining an output IF of an Ethernet frame input from the MAC 612~624 and transferring the same to the MAC 612~624 connected to the predetermined IF as described above.

In the following, each unit of the frame switching unit 630 will be described.

The frame analysis unit 700 has a function of analyzing a frame input from the MAC 621~624 and when the frame is a main signal data frame which is the ordinary Ethernet frame 400, transferring header information and input port information to the table search unit 730 and the MAC learning unit 750 and a function of transferring an entire frame or a payload part to the frame rewriting unit 710, and a function of transferring the entire frame to the control frame distribution unit 760 when an input frame is the OAM frame 500 or other control frame such as a Bridge Protocol Data Unit (hereinafter referred to as BPDU) which is a control frame of STP/RSTP.

As to the OAM frame 500, because a Type value dedicated to an OAM frame is stored in the Type field 510, the frame analysis unit 700 is allowed to identify an OAM frame.

While various kinds of frames exist as the OAM frame 500, the present invention, targeting only LT, is assumed to have only an LT Request frame and an LT Reply frame transferred.

The frame rewriting unit 710 has a function of executing frame rewriting with respect to a main signal data frame received from the frame analysis unit 700 when instructed by the table search unit 730. As the frame rewriting function, the frame rewriting unit 710 has a function of inserting or deleting a VLAN tag into/from the Ethernet frame 400 and transferring the frame subjected to appropriate rewriting processing to the frame transfer unit 720.

The frame transfer unit 720 has a main signal data frame input from the frame rewriting unit 710 and a control frame input from the control frame distribution unit 760.

The frame transfer unit 720 has a function, as to a main signal data frame, of transferring a main signal data frame received from the frame rewriting unit 710 to the MAC 621~624 corresponding to an output port received from the table search unit 730 and a function, as to a control frame, of transferring a control frame received from the control frame distribution unit 760 to the MAC 621~624 corresponding to a simultaneously received output port.

The table search unit 730 has a function of referring to the forwarding table 740 to obtain output port information based on header information and input port information received from the frame analysis unit 700.

Before describing an output port information obtaining method, description will be here made of a structure of the forwarding table 740.

Figures 6, 7:
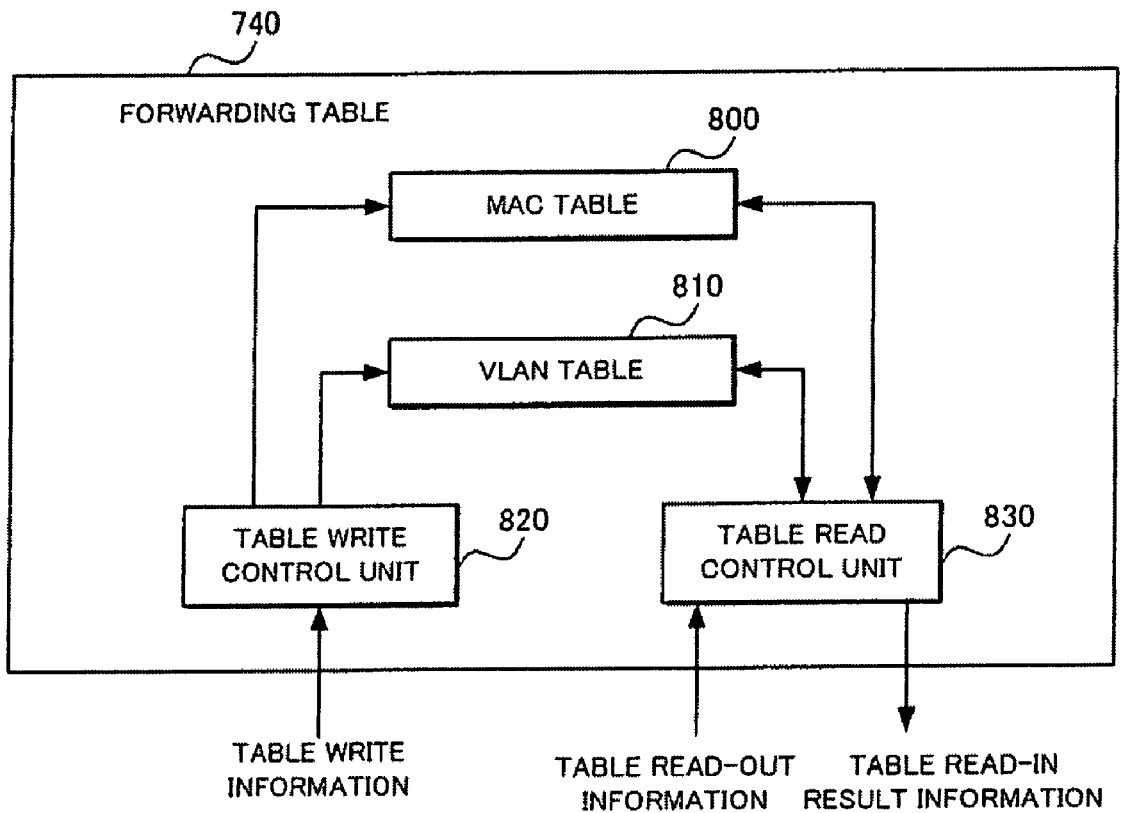
FIG. 6 is a diagram showing a structure of a forwarding table according to the first exemplary embodiment.
FIG. 7 is a MAC table according to the first exemplary embodiment.

FIG. 6 is a block diagram showing an example of a structure of the forwarding table 740.

The forwarding table 740 has various kinds of tables in which information for transferring a frame is stored. Tables include a MAC table 800 for obtaining an output port from a MAC address and a VLAN tag and a VLAN table 810 for obtaining an output port based on a VLAN tag.

The forwarding table 740 is formed of the above-described MAC table 800 and VLAN table 810, and a table rewrite control unit 820 and a table read control unit 830.

New data write to the above-described respective tables is executed through the table write control unit 820 and data read from the above-described respective tables is executed through the table read control unit 830.

Structures of the MAC table 800 and the VLAN table 810 are as shown in FIG. 7 and FIG. 8, respectively, of which the MAC table 800 has an output port stored corresponding to a pair of a MAC address and a VLAN (Virtual LAN) tag, and has an LT flag field.

Stored in the LT flag field are a value of 0 when its entry is an entry of a normal state and a value of 1 when its entry is an entry as of before switching at the time of execution of failure switching.

Stored in the VLAN table 810 is an output port for a VLAN tag.

The MAC table 800 is updated by the MAC learning unit 750, rewriting from the value of 0 to the value of 1 in the LT flag field is executed by the STP control unit 780, and the VLAN table 810 is updated by the STP control unit 780.

Stored as an output port for a VLAN tag in the VLAN table 810 is a port not in the blocking state in STP related to the VLAN. Structures of the tables are not limited to those shown in FIG. 7 and FIG. 8.

As described above, the table search unit 730 has a function of referring to such forwarding table 740 to obtain output port information corresponding to frame header information received from the frame analysis unit 700.

More specifically, the table search unit 730 has a function of referring to the MAC table 800 of the forwarding table 740 to obtain an output port for MAC_DA (Direction Address) (transmission destination MAC address) and VLAN received from the frame analysis unit 700.

In more detail, the table search unit 730 has a function of referring to the MAC table 800 and when there exists an entry whose LT flag field has the value of 0 related MAC_DA and VLAN, obtaining corresponding port information and thereafter notifying the frame transfer unit 720 of the output port information and a function of, on the other hand when there exists no relevant entry in the MAC table 800, referring to the VLAN table 810 to obtain an output port for VLAN and thereafter notifying the frame transfer unit 720 of the output port information.

The MAC learning unit 750 has a function of, upon receiving header information from the frame analysis unit 700, referring to the MAC table 800 of the forwarding table 740 to search an output port for MAC_SA (Source Address) (transmission source MAC address) and VLAN of the received header information and when there exists no relevant entry, storing MAC_SA in the MAC address field, VLAN in the VLAN field and a reception port in the output port field and setting the value of the LT flag field to 0.

The control frame distribution unit 760 has a function of transferring a control frame received from the frame analysis unit 700 to a predetermined processing unit, as well as transferring a control frame and output port information received from the processing unit to the frame transfer unit 720.

In the present structure, among the processing units are the OAM control unit 770 and the STP control unit 780 and among respective control frames are the OAM frame 500 and BPDU.

The control frame distribution unit 760 has a function of, upon receiving the OAM frame 500 from the frame analysis unit 700, transferring the received OAM frame 500 to the OAM control unit 770 and transferring the OAM frame 500 and the output port information from the OAM control unit 770 to the frame transfer unit 720.

The OAM frame 500 only includes an LT Request frame and an LT Reply frame as a target as described above.

The control frame distribution unit 760 has a function of, upon receiving BPDU from the frame analysis unit 700, transferring the received BPDU to the STP control unit 780 and transferring the BPDU and the output port information received from the STP control unit 780 to the frame transfer unit 720.

The OAM control unit 770 has a function of generating an LT Request frame in response to an LT execution request from the setting control unit 790, referring to the forwarding table 740 to obtain an output port and transferring an LT Request frame to the control frame distribution unit 760.

The OAM control unit 770 also has a function of, upon receiving an LT Request frame from other node from the control frame distribution unit 760, executing processing of TTL value and the like, referring to the forwarding table 740 to obtain an output port and transmitting the LT Request frame to the control frame distribution unit 760, and a function of generating an LT Reply frame simultaneously with the transmission and referring to the forwarding table 740 to obtain an output port, and transmitting an LT Reply frame to the control frame distribution unit 760.

The OAM control unit 770 further has a function of, upon receiving an LT Reply frame from other node from the control frame distribution unit 760, holding a frame transmission source address and a TTL value and sorting a TTL value of each LT Reply frame to obtain information of devices passed through as a result of LT, and a function of notifying the setting control unit 790 of the obtained result.

The foregoing is the outline of the functions of the OAM control unit 770 and the following will be description of a detailed structure of the OAM control unit 770 with reference to FIG. 9.

FIG. 9 is a diagram showing a structure of the OAM control unit 770. The OAM control unit 770 is formed of an OAM frame kind filter 1100, a target address filter 1110, a table reference unit 1120, a frame generation unit 1130, an LT Reply frame analysis unit 1140, a TTL subtraction unit 1150 and a frame transmission unit 1160.

The OAM frame kind filter 1100 has a function of determining a kind of OAM frame received from the control frame distribution unit 760 based on the Opcode 520 of the OAM frame and when a kind of OAM frame is an LT Request frame, transmitting the frame to the target address filter 1110 and when a kind of OAM frame is an LT Reply frame, transmitting the frame to the LT Reply frame analysis unit 1140.

The LT Reply frame analysis unit 1140 has a function of, upon receiving an LT Reply frame from the OAM frame kind filter 1100, obtaining a transmission source address of the LT Reply frame from the MAC_SA field 420 of the LT Reply frame and obtaining a TTL value from the TTL field 540 and a function of making a transmission source address and a TTL value into a list related to an LT Reply frame whose Transaction-ID is the same and sorting the TTL values in a descending order.

The LT Reply frame analysis unit 1140 has a function of, upon receiving a notification of timer expiration from the frame generation unit 1130, notifying the setting control unit 790 of a list obtained by sorting as a result of LT.

Stored in the resultant list are addresses of devices located from the LT Request generating device toward a target device in order.

The target address filter 1110 has a function of obtaining a target address of an LT Request frame from the target address field 550 and when the target address is that of other node, transmitting the frame to the table reference unit 1120 and the TTL subtraction unit 1150 and when the target address is that of its own node, transmitting the frame only to the TTL subtraction unit 1150.

The TTL subtraction unit 1150 has a function of obtaining a TTL value of an LT Request frame from the TTL field 540, subtracting 1 from the TTL value and transmitting the LT Request frame whose TTL value is subtracted by 1 to the frame transmission unit 1160 and a function of transmitting a transmission source address of an LT Request frame (transmission destination address of an LT Reply frame) and a TTL value subtracted by 1 to the frame generation unit 1130 to instruct on generation of an LT Reply frame.

The frame generation unit 1130 has a function of, upon receiving an LT execution request from the setting control unit 790, storing target address information received from the setting control unit 790 in the target address field 550 and storing either one of mode information, a normal mode or a failure switching mode, in the LT mode field 560 to generate an LT Request frame, and transmitting the generated LT Request frame to the frame transmission unit 1160.

Here, the normal mode is LT according to a MAC address learning condition at that time point, which is a mode of confirming a current transfer route. On the other hand, the failure switching mode is LT according to a MAC address learning condition as of before execution of failure switching, which is a mode of specifying a failing part.

The frame generation unit 1130 has a function of storing an ID for discriminating correspondence of a Reply frame to a Request frame in a Transaction-ID field (TID) 530 of an LT Request frame and a function of transmitting target address information and mode information to the table reference unit 1120 simultaneously with storage.

The frame generation unit 1130 has a function of generating an LT Reply frame upon receiving a generation instruction from the TTL subtraction unit 1150.

The frame generation unit 1130 has a function of, upon here receiving a generation instruction from the TTL subtraction unit 1150, generating an LT Reply frame based on transmission destination address information, a TTL value and a Transaction-ID of an LT Reply frame to transmit the generated LT Reply frame to the frame transmission unit 1160, and transmitting transmission destination address information to the table reference unit 1120 simultaneously with the transmission of the generated LT Reply frame.

The table reference unit 1120 has a function of, upon receiving target address information and mode information of an LT Request frame from the frame generation unit 1130, referring to the MAC table 800 of the forwarding table 740 to obtain corresponding output port information and transmitting the output port information to the frame transmission unit 1160.

The table reference unit 1120 has a function of, when receiving an LT Request frame from the target address filter 1110, extracting target address information and mode information from the frame and referring to the MAC table 800 of the forwarding table 740 to obtain corresponding output port information, and transmitting the output port information to the frame transmission unit 1160.

The table reference unit 1120 also has a function of, upon receiving transmission destination address information of an LT Reply frame from the frame generation unit 1130, referring to the MAC table 800 of the forwarding table 740 to obtain corresponding output port information, and transmitting the output port information to the frame transmission unit 1160.

The frame transmission unit 1160 has a function of transferring an LT Request frame received from the frame generation unit 1130 or an LT Request frame received from the TTL subtraction unit 1150 or an LT Reply frame received from the frame generation unit 1130, and corresponding output port information received from the table reference unit 1120 in pair to the control frame distribution unit 760.

The frame transmission unit 1160 further has a function of, in order to measure a valid term of a transmitted LT Request frame, starting a timer effective for X seconds (e.g. 5 seconds) related to a Transaction ID of the LT Request frame and when the timer expires, notifying the LT Reply frame analysis unit 1140 of the expiration.

The STP control unit 780 has a function of executing update processing of port information of STP/RSTP based on BPDU received from the control frame distribution unit 760 or other processing, re-generating BPDU, and in order to transfer the same to an adjacent switch, transferring the BPDU and the output port information to the control frame distribution unit 760.

Since the above-described port information updating processing and BPDU re-generation processing are conformed to IEEE802.ID/w/s or the like, no detailed description will be here made thereof.

According to ordinary STP/RSTP operation in the related art, when receiving a topology change message in the course of re-structuring of STP/RSTP at the time of failure occurrence, a MAC address entry already learned at a port having received the message is flushed. On the other hand, according to the present invention, an address to be flushed at the time of receiving a topology change message is not flushed but the value of the LT flag field of the MAC table 800 is updated from 0 to 1. This processing enables a MAC address entry as of before switching at the time of execution of failure switching (LT flag field=1) together with an ordinary MAC address entry (LT flag field=0) to be held similarly to the related art.

The setting control unit 790 has a function of receiving, through the CPU 650, setting information input through the console I/O 660 shown in FIG. 4 to execute setting processing with respect to an appropriate processing unit.

More specifically, the setting control unit 790 has a function of, upon receiving an LT execution request input through the console I/O, instructing the OAM control unit 770 to execute LT (to instruct on generation of an LT Request message). This function here is a function of transferring an address of a target device and either mode information, the ordinary state LT or the LT as of before failure switching, to the OAM control unit 770. The setting control unit 790 has a function of, upon completion of LT control, receiving a result of LT executed by the OAM control unit 770 to output the received LT result through the CPU 650 via the console I/O.

In addition, the setting control unit 790 has a function of setting a parameter in the OAM control unit 770 and the STP control unit 780.

Description will be here made of a hardware structure of the switches S1 through S8.

Figure 10:
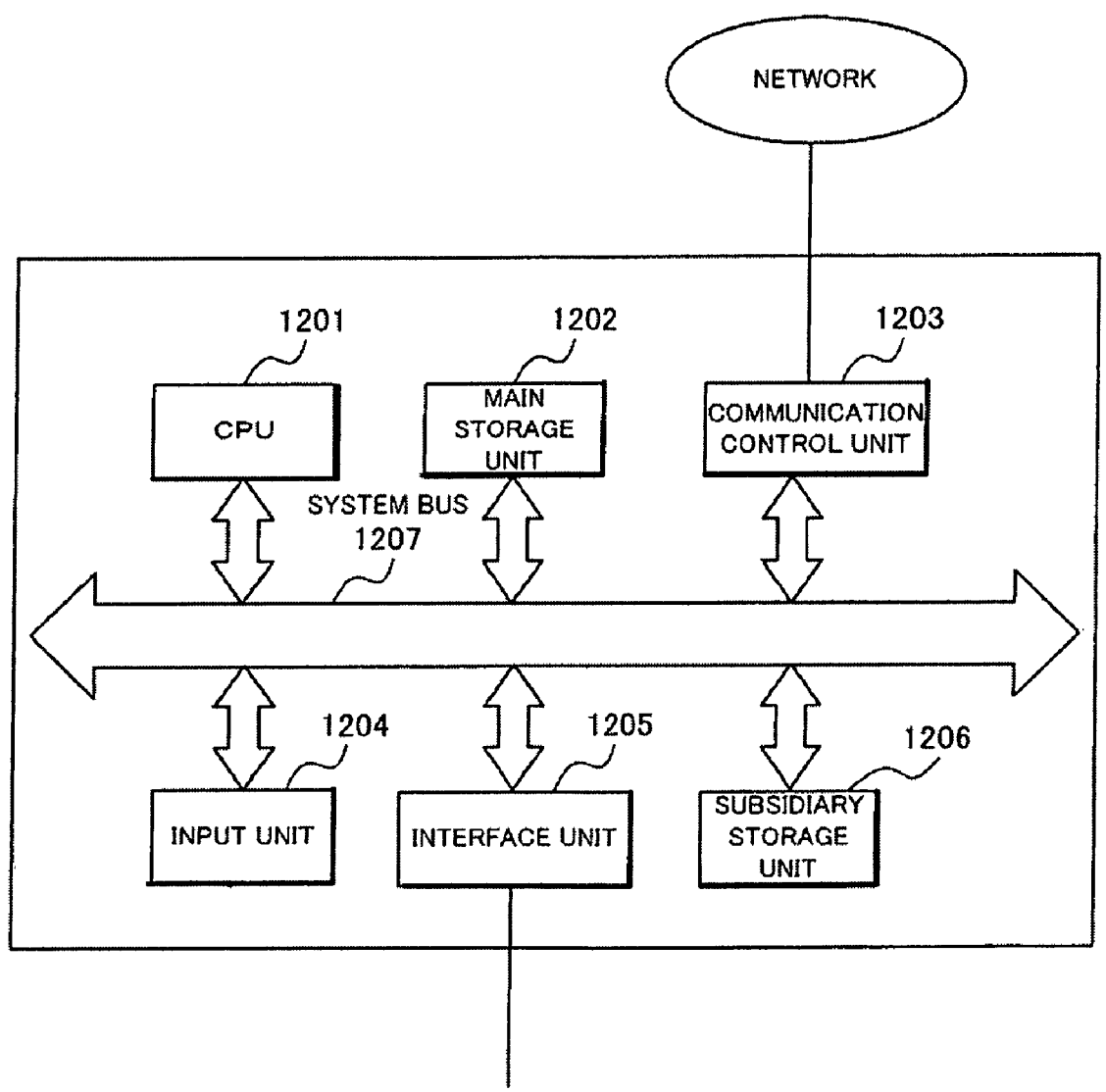
FIG. 10 is a block diagram showing a hardware structure of a switch according to the first exemplary embodiment.

FIG. 10 is a block diagram showing a hardware structure of the switches S1 through S8 on a physical network according to the present exemplary embodiment.

With reference to FIG. 10, the switch S1~S8 according to the present invention, which can be realized by the same hardware structure as that of a common computer device, comprises a CPU (Central Processing Unit) 1201 (FIG. 4, CPU 650), a main storage unit 1202 which is a main memory such as a RAM (Random Access Memory) for use as a data working region or a data temporary saving region, a communication control unit 1203 (FIG. 4, IF 601~IF 604, PHY 611~PHY 614) for transmitting and receiving data through a network, an input unit 1204 (FIG. 4, console I/O 660) such as a keyboard or a mouse, an interface unit 1205 connected to a peripheral apparatus for transmitting and receiving data, a subsidiary storage device 1206 (FIG. 4, memory 640) which is a hard disk device formed of a non-volatile memory such as a magnetic disk or a semiconductor memory, and a system bus 1207 for connecting the above-described respective components of the present information processing device with each other.

The switch S1~S8 according to the present invention has its operation realized not only in hardware, with a circuit part formed of a hardware part such as an LSI (Large Scale Integration) mounted which has a program realizing these functions incorporated into the switch S1~S8 but also in software by executing a program providing each function of the above-described components by the CPU 1201 on the computer processing device.

More specifically, the CPU 1201 realizes the above-described functions in software by loading the program stored in the subsidiary storage unit 1206 into the main storage unit 1202 and executing the same to control the operation of the switches S1 through S8.

(Operation of First Exemplary Embodiment)

Description will be made of an LT execution method according to the present exemplary embodiment in a case of executing LT from the terminal T2 to the terminal T1 in the network shown in FIG. 1 formed of the switches S1 through S8 having the foregoing described structure. Use of the method according to the present exemplary embodiment enables a transfer route to a target device to be confirmed, as well as a failing part to be specified after failure switching which is impossible in the related art.

(Processing Flow at OAM Control Unit 770)

While the outlines of functions and the detailed structure of the OAM control unit 770 have been described in the foregoing, detailed operation of the OAM control unit 770 will be described in the following with reference to FIG. 11 through FIG. 13.

For the OAM control unit 770, related to LT control, there exist control in a case of generating an LT Request frame at its own node, control in a case of terminating an LT Reply frame at its own node and control in a case of relaying an LT Request frame from other node, as well as control in a case of generating an LT Reply frame. Description will be made of each control with reference to a processing flow.

(Control in Case of Generating LT Request Frame from Own Node)

FIG. 11 shows a processing flow of control in a case of generating an LT Request frame from its own node.

At Step S101, the frame generation unit 1130 receives an LT execution request from the setting control unit 790 through the I/O console. The LT execution request from the setting control unit 790 includes address information and mode information, a normal mode or a failure switching mode of a target device which executes LT.

As described above, the normal mode here is LT according to a MAC address learning condition at that time point, which is a mode of confirming a current transfer route and the failure switching mode is LT according to a MAC address learning condition as of before execution of failure switching, which is a mode of specifying a failing part.

The frame generation unit 1130 generates an LT Request frame based on target address information and mode information to transfer the generated LT Request frame to the frame transmission unit 1160 at Step S102.

The frame generation unit 1130 transfers the target address information and the mode information to the table reference unit 1120 at Step S103.

Thereafter, the table reference unit 1120 refers to the MAC table 800 of the forwarding table 740 to search for an entry having matching target address and mode information and obtains relevant output port information to transfer the same to the frame transmission unit 1160 at Step S104.

The frame transmission unit 1160 transfers the LT Request frame transmitted at Step S102 and the output port information transmitted at Step S104 in pair to the control frame distribution unit 760, as well as starting the timer for measuring a valid term of the transmitted LT Request frame at Step S105. The foregoing completes the LT Request frame generation processing.

(Control in Case of Terminating LT Reply Frame at Own Node)

Next, description will be made of control in a case of terminating an LT Reply frame at its own node with reference to FIG. 12.

The OAM frame kind filter 1100, upon receiving an LT Relay frame from the control frame distribution unit 760 at Step S201, determines that the received frame is an LT Reply frame to transfer the frame to the LT Reply frame analysis unit 1140 at Step S202.

At Step S203, the LT Reply frame analysis unit 1140 obtains addresses of devices located from MAC_SA of the received LT Reply frame to a transmission source device of an LT Reply frame, that is, an LT target device. At the same time, extract a TTL value stored in the LT Reply frame. Then, related to LT Reply frames whose Transaction-ID are the same, make address information and TTL values into a list to sort the TTL values in descending order.

On the other hand, when the timer started at Step S105 in FIG. 11 expires, the frame transmission unit 1160 notifies the LT Reply frame analysis unit 1140 that the timer expires related to the relevant Transaction-ID at Step S204. Responsively, the LT Reply frame analysis unit 1140 considers the list obtained at the time of sorting to be a result of LT.

Then, at Step S205, the LT Reply frame analysis unit 1160 notifies the setting control unit 790 of the resultant list. The foregoing completes the processing executed in a case of terminating an LT Reply frame.

(Control in Case of Relaying LT Request Frame from Other Node, While Generating LT Reply Frame)

Description will be made of control in a case of relaying an LT Request frame from other node, as well as generating an LT Reply frame with reference to FIG. 13.

Upon receiving an LT Request frame from the control frame distribution unit 760 at Step S301, the OAM frame kind filter 110Q determines that the received frame is an LT Request frame to transfer the frame to the target address filter 1110 at Step S302.

The target address filter 1110 determines whether a target address of the LT Request frame is that of its own node or other node at Step S303.

As a result, when the target address is that of other node, the target address filter 1110 transfers the target address information and the mode information to the table reference unit 1120 at Step S304.

Thereafter at Step S305, the table reference unit 1120 refers to the MAC table 800 of the forwarding table 740 to search for an entry having matching target address and mode information and obtains corresponding output port information. When output port information is obtained, the table reference unit 1120 transfers the information to the frame transmission unit 1160.

When the target address is that of other node at Step S303, the target address filter 1110 transfers the LT Request frame to the TTL subtraction unit 1150 at Step S306.

The TTL subtraction unit 1150 subtracts 1 from the TTL value of the LT Request frame and transfers the obtained LT Request frame to the frame transmission unit 1160 at Step S307.

The frame transmission unit 1160 transfers the output port information received at Step S305 and the LT Request frame received at Step S307 to the control frame distribution unit 760 at Step S308. The foregoing completes the LT Request frame relay transfer processing.

On the other hand, as a result of the determination at Step S303, when the target address is that of its own node, the target address filter 1110 transfers the LT Request frame to the TTL subtraction unit 1150 at Step S309.

The TTL subtraction unit 1150 subtracts 1 from the TTL value of the LT Request frame and transfers the obtained LT Request frame to the frame transmission unit 1160 at Step S310.

Furthermore, at Step S311 and the following steps, LT Reply frame generation processing is executed.

At Step S311, the TTL subtraction unit 1150 notifies the frame generation unit 1130 of the transmission source address and the TTL value of the LT Request frame to instruct on generation of an LT Reply frame.

The frame generation unit 1130 generates an LT Reply frame based on the transmission source address information and the TTL value to transfer the same to the frame transmission unit 1160 at Step S312.

The frame generation unit 1130 also transfers a transfer destination address (transmission source address of the LT Request frame) to the table reference unit 1120 at Step S313.

The table reference unit 1120 refers to the MAC table 800 of the forwarding table 740 to obtain output port information corresponding to the transfer destination address and transfers the obtained output port information to the frame transmission unit 1160 at Step S314.

The frame transmission unit 1160 transfers the LT Reply frame received at Step S312 and the output port information received at Step S314 to the control frame distribution unit 760 at Step S315.

The foregoing completes the processing executed when relaying an LT Request frame from other node, as well as generating an LT Reply frame.

Next, a setting example of the MAC table 800 in a case where the present invention is used will be described.

Shown in FIG. 14 is the MAC table 800 in a case where MAC address learning is completed in the normal state in the network shown in FIG. 1.

Here, with VLAN as X, stored in the switches S1 through S8 are entries of MAC#t1 and VLAN#X, and MAC#t2 and VLAN#X. Since in each entry, the LT flag indicates the normal mode, the value of 0 is set.

Figure 15:
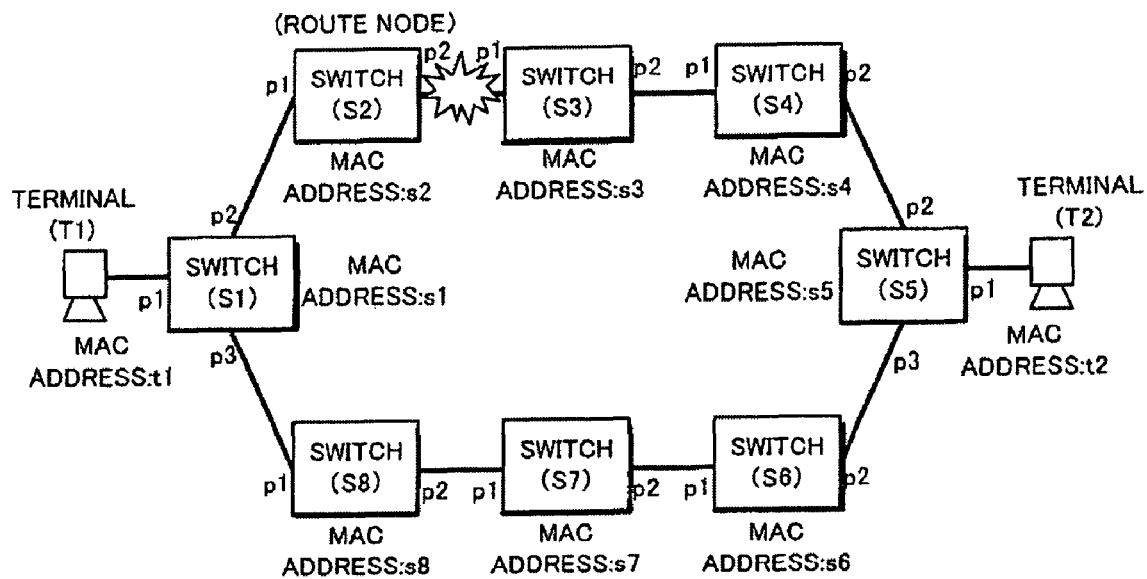
FIG. 15 is a diagram showing a network model at the time of failure occurrence according to the first exemplary embodiment.

Assume here that in the network shown in FIG. 1, there occurs a failure on a link between the switch S2 and the switch S3 as shown in FIG. 15. In such a case, BPDU is exchanged according to an STP/RSTP procedure to make a link between the switch S6 and the switch S7 be an active link, thereby restructuring topology.

Shown in FIG. 16 is a setting state of the MAC table 800 in the course of this processing.

In FIG. 16, entries of the port p2 of the switch S2 and the port p1 of the switch S3 having sensed a failure are flushed.

As a characteristic of the present invention, an entry of a port having received a topology change message is not flushed, which is flushed in the related art, but the entry remains with an LT flag of the entry changed to 1.

As one example, the port p2 of the switch S1 receives a topology change message from the switch S2 and at that time, an entry of MAC#t2 and VLAN#X learned at the port p2 is not flushed but the entry remains with the LT flag rewritten from 0 to 1.

The same processing is executed with respect to an entry of MAC#t1 and VLAN#X of the switch S4, an entry of MAC#t1 and VLAN#X of the switch S5, entries of MAC#t1 and VLAN#X, and MAC#t2 and VLAN#X of the switch S6, entries of MAC#t1 and VLAN#X, and MAC#t2 and VLAN#X of the switch S7, and entries of MAC#t1 and VLAN#X, and MAC#t2 and VLAN#X of the switch S8, all of which remain as entries whose LT flag is 1.

Shown in FIG. 17 is a setting state of the MAC table 800 as of after frame transfer is resumed in the network shown in FIG. 15.

MAC address entry learned on new topology is stored in the MAC table 800 of each node with the LT flag being 0.

Each entry is here managed including an LT flag and for example, while in the MAC table 800 of the switch S1, there exist two entries of MAC#t2 and VLAN#X, an original entry has the LT flag of 1 and an entry learned thereafter will be stored in the table as another entry with the LT flag as 0.

(Failing Part Specifying Processing)

Description will be made in the following of a case where LT in the failure switching mode with the devices from the terminal T2 to the terminal T1 as target devices is executed in the network of FIG. 15 when the MAC table is in such a state as shown in FIG. 17.

The terminal T2 as a transmission source transmits an LT Request frame (initial value of TTL is assumed to be 255).

The switch S5 having received the LT Request frame from the terminal T2 searches the MAC table 800 shown in FIG. 17 for an entry having the address MAC#t1 and VLAN#X of the terminal T1 as a target device and the LT flag of 1 which is the failure switching mode.

The switch S5 obtains the port p2 as a result to transfer a Request frame whose TTL value is subtracted by 1 (TTL=254) to the port p2.

The switch S5 also returns an LT Reply frame with the TTL value of 254 stored to the terminal T2 as a Request issuing source device.

The switch S4 as a node at a subsequent stage on the side of the port p2 of the switch S5 searches the MAC table 800 shown in FIG. 17 for an entry having the address MAC#t1 and VLAN#X of the terminal T1 as a target device and the LT flag of 1 which is the failure switching mode.

The switch S4 obtains the port p1 as a result to transfer a Request frame whose TTL value is subtracted by 1 (TTL=253) to the port p1.

The switch S4 also returns an LT Reply frame with the TTL value of 253 stored to the terminal T2 as a Request issuing source device.

The switch S3 as a node at a subsequent stage on the side of the port p1 of the switch S4 searches the MAC table 800 shown in FIG. 17 for an entry having the address MAC#t1 and VLAN#X of the terminal T1 as a target device and the LT flag of 1 which is the failure switching mode.

As a result, since there exists no relevant entry, the switch S3 abandons the LT Request frame to return an LT Reply frame whose TTL value is subtracted by 1 (TTL value=252) to the terminal T2 as a Request issuing source device.

On the other hand, note the terminal T2 as an LT Request frame issuing source device, it receives the LT Reply frame (TTL=254) from the switch S5, the LT Reply frame (TTL=253) from the switch S4 and the LT Reply frame (TTL=252) from the switch S3.

Sorting the addresses to have TTL in descending order by the terminal T2 obtains the switch S5->the switch S4->the switch S3. As a result of timer expiration, if no other Reply frame than those described above are received at the terminal T2, this will be the result of LT.

Since this result fails to include the terminal T1 as a target device, it can be found that a failure occurs at a part before reaching the terminal T1 and it can be confirmed by the sorting result of the Reply frame that switches up to the switch S3 remain and some failure or other occurs on the route to follow.

Thus, even when LT is executed after failure switching is executed at failure occurrence, use of the method of the present embodiment enables LT to be executed on a route as of before switching to specify a failing part.

(Current Transfer Route Confirmation Processing)

As a matter of course, a current transfer route can be confirmed. Execution of LT in the normal mode with the devices located between the terminal T2 and the terminal T1 as target devices in the network shown in FIG. 15 enables a current transfer route to be confirmed.

When the transmission source terminal T2 transmits an LT Request frame (the initial value of TTL is assumed to be 255), the switch S5 having received the LT Request frame searches the MAC table 800 shown in FIG. 17 for an entry having the address MAC#t1 and VLAN#X of the terminal T1 as a target device and the LT flag of 0 which is the normal mode.

The switch S5 obtains the port p3 as a result to transfer a Request frame whose TTL value is subtracted by 1 (TTL=254) to the port p3.

The switch S5 also returns an LT Reply frame with the TTL value of 254 stored to the terminal T2 as a Request issuing source device.

Since the switch S6 as a node at a subsequent stage on the side of the port p3 of the switch S5 searches for an entry having the address MAC#t1 and VLAN#X of the terminal T1 as a target device and the LT flag of 0 which is the normal mode to obtain the port p1, it transfers a Request frame whose TTL value is subtracted by 1 (TTL=253) to the port p1.

The switch S6 also returns an LT Reply frame with the TTL value of 253 stored to the terminal T2 as a Request issuing source device.

Similarly, repeating the search of an entry having MAC#t1 and VLAN#X and LT flag of #0, the Request frame transfer processing and the Reply frame generation processing at each switch results in that LT Reply frames from the switch S7 (TTL=252), the switch S8 (TTL=251), the switch S1 (TTL=250) and the terminal T1 (TTL=249) arrive at the terminal T2.

Sorting the addresses to have TTL in descending order by the terminal T2 obtains the switch S5->the switch S6->the switch S7->the switch S8->the switch S1->the terminal T1. As a result of timer expiration, if no other Reply frame than those described above are received at the terminal T2, this will be the result of LT to confirm the devices on a transfer route to the terminal T1 as a target device.

(Effects of the First Exemplary Embodiment)

As described in the foregoing, according to the use of the method of the present exemplary embodiment, when failure switching is executed at failure occurrence, not by flushing a MAC address entry as of before switching but by adding a flag indicative of an entry as of before switching, the MAC address entry as of before switching is held even after the failure switching.

Then, in a case of executing LT after failure switching at failure occurrence, when at the time of designating the normal mode for confirming a current transfer route or the failure switching mode for specifying a failing part at a time of making an LT request, the failure switching mode is designated, transferring an LT Request frame according to a MAC address entry as of before switching in the MAC table enables the LT Request frame to reach a node immediately preceding to the failure occurrence part and returning an LT Reply frame by each node enables a failing part to be specified.

(Second Exemplary Embodiment)

Other exemplary embodiment of the present invention will be described in detail with reference to the drawings.

(Structure of Second Exemplary Embodiment)

Figure 18:
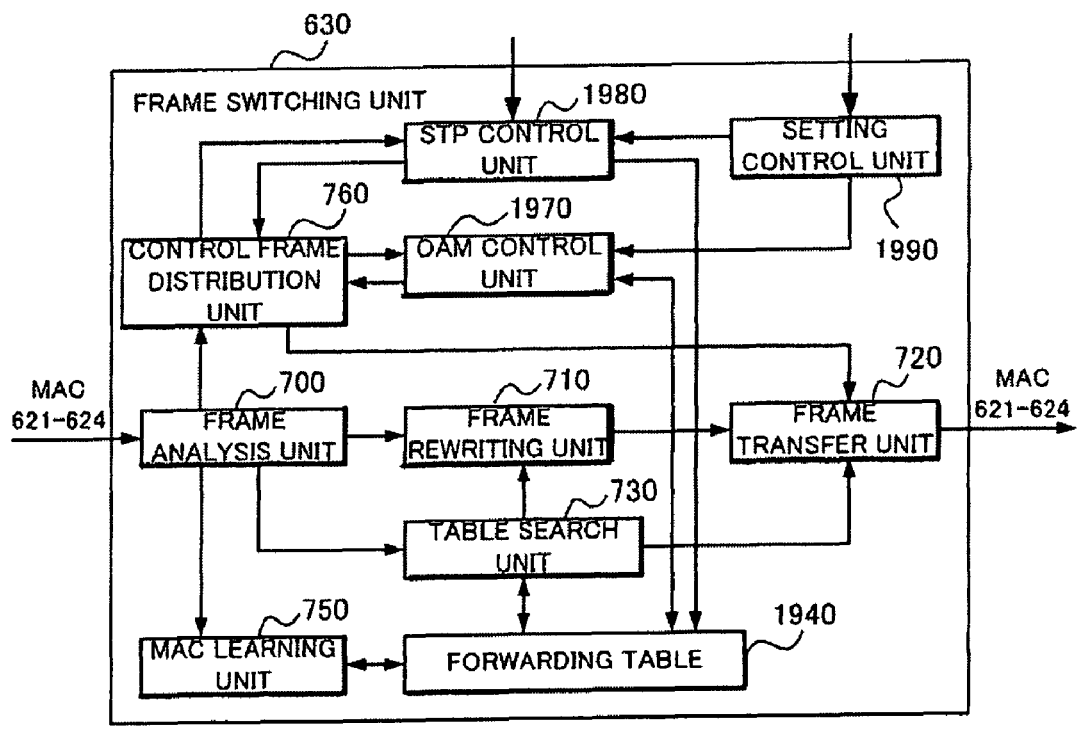
FIG. 18 is a diagram showing a structure of a frame switching unit according to a second exemplary embodiment of the present invention.

FIG. 18 shows a detailed structure of the frame switching unit 630 according to the second exemplary embodiment.

Shown in FIG. 18 is the frame switching unit 630 according to the first exemplary embodiment illustrated in FIG. 5, in which the forwarding table 740 is replaced by a forwarding table 1940, the OAM control unit 770 by an OAM control unit 1970, the STP control unit 780 by an STP control unit 1980 and the setting control unit 790 by a setting control unit 1990. In the following, the second exemplary embodiment will be described mainly with respect to a difference from the first exemplary embodiment.

First, the forwarding table 1940 will be described.

In the forwarding table 1940, in comparison with the forwarding table 740, the MAC table 800 is replaced by a MAC table 2000 shown in FIG. 19. More specifically, the MAC table 2000 has no LT flag field which is introduced into the MAC table 800, in which determination between the normal mode and the failure switching mode by the LT flag field is realized by changing a part of a MAC address in the MAC table 2000 by the STP control unit 1980 which will be described later in the present exemplary embodiment.

Next, the STP control unit 1980 will be described.

The STP control unit 1980 executes the processing of STP/RSTP according to IEEE802.1D/w/s or the like similarly to the STP control unit 780.

As a characteristic processing of the present invention, in addition to the ordinary STP/RSTP processing, the STP control unit 780 has the function of updating the value of the LT flag field of the MAC table 800 from 0 to 1 without flushing an address to be flushed at the time of receiving a topology change message.

On the other hand, the STP control unit 1980 of the present exemplary embodiment has a function of changing a part of a MAC address in the MAC table 2000 without flushing an address to be flushed at the time of receiving a topology change message.

Figure 20:
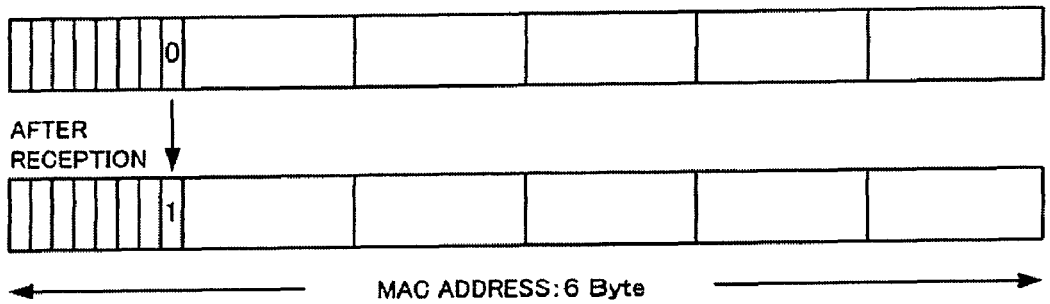
FIG. 20 is a diagram showing an example of address conversion of a target address according to the second exemplary embodiment.

More specifically, the STP control unit 1980 has a function of converting an eighth bit defined as a multicast bit in an ordinary MAC address to the value of 1 as shown in FIG. 20.

In the normal state, the MAC address learned by the MAC table 2000 is a unicast address and a multicast bit has the value of 0, the bit is used for discrimination between the normal mode and the failure switching mode.

In addition, since a frame having a multicast MAC address refers not to the MAC table 2000 but to other table for multicast, conversion of a multicast bit of an entry in the MAC table 2000 will cause no erroneous operation in frame transfer processing.

According to the present exemplary embodiment, the function of the STP control unit 1980 enables an ordinary MAC address entry (multicast bit=0) to be held similarly to the related art, as well as holding a MAC address entry (multicast bit=1) as of before switching at the time of execution of failure switching.

Next, the OAM control unit 1970 will be described.

Figure 21:
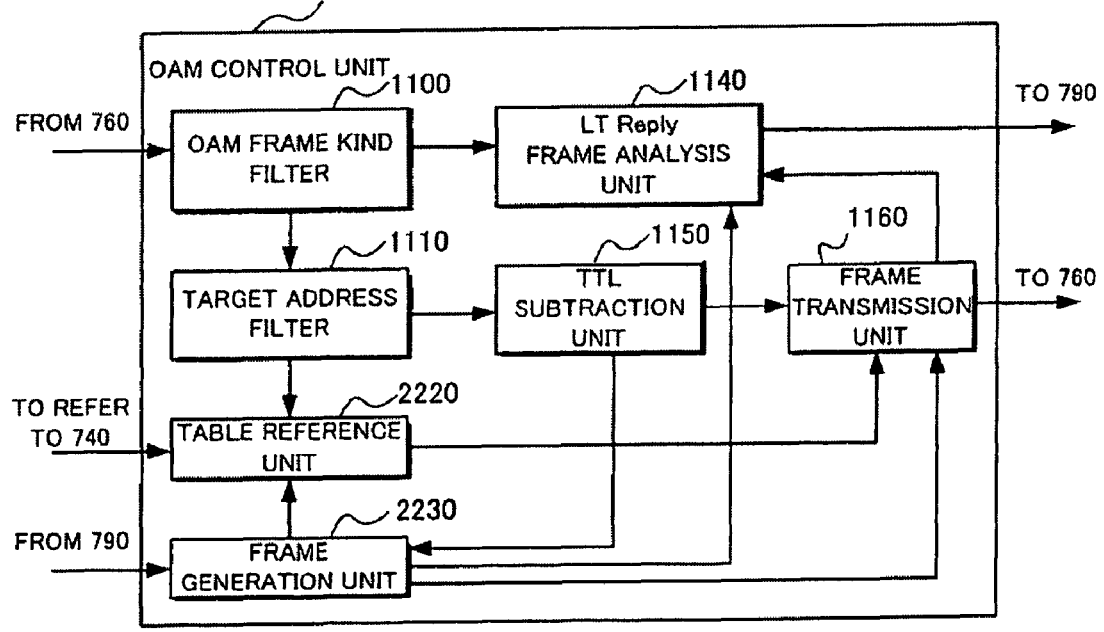
FIG. 21 is a diagram showing a structure of an OAM control unit according to the second exemplary embodiment.

Basic structure of the OAM control unit 1970 is the same as that of the OAM control unit 770. The difference is that the table reference unit 1120 is replaced by a table reference unit 2220 and the frame generation unit 1130 by a frame generation unit 2230 as shown in FIG. 21.

The difference in function is as follows.

Upon receiving an LT execution request from the setting control unit 790, the frame generation unit 1130 generates an LT Request frame based on target address information received from the setting control unit 790 and either mode information, the normal mode or the failure switching mode.

On the other hand, in the present exemplary embodiment, discrimination of a mode, the normal mode or the failure switching mode, is made by a multicast bit of a MAC address.

Therefore, the frame generation unit 2230 has a function of receiving only target address information from the setting control unit 1990 to generate an LT Request frame.

In other words, according to the present exemplary embodiment, an LT Request frame fails to include the LT mode field 560 in which mode information, the normal mode or the failure switching mode, is stored, but a target address itself includes the information.

When a multicast bit of a target address has the value of 0, which indicates the normal mode, executing LT according to a MAC address learning condition at that time enables a current transfer route to be confirmed.

On the other hand, when a multicast bit of the target address has the value of 1, which indicates the failure switching mode, executing LT according to a MAC address learning condition as of before execution of failure switching enables a failing part to be confirmed.

The table reference unit 1120 has the function of, upon receiving the target address information and the mode information of the LT Request frame from the frame generation unit 1130, referring to the MAC table 800 of the forwarding table 740 to obtain output port information corresponding to the target address information and the mode information.

On the other hand, the table reference unit 2220 has a function of referring to the MAC table 2000 of the forwarding table 1940 to obtain output port information corresponding to target address information including mode information.

Lastly, the setting control unit 1990 will be described.

The setting control unit 1990 has a difference from the setting control unit 790 in having a function of notifying the OAM control unit 770 of an LT execution request input through the console I/O.

More specifically, the setting control unit 790 has the function of, at the time of notifying the OAM control unit 770 of an LT execution request, transferring an address of a target device and either of the information, the normal mode or the failure switching mode.

On the other hand, since the setting control unit 1990 has a function of notifying the OAM control unit 1970 of a target address as it is when an LT execution mode of an LT execution request is the normal mode and notifying the OAM control unit 1970 of a target address whose multicast bit (eighth bit) changed to the value 1 when the LT execution mode of an LT execution request is the failure switching mode, no mode information is notified in either case.

The present exemplary embodiment is designed to have no need of converting a target address by the setting control unit 1990 according to a requested mode to send mode information because mode information is included in a target address, so that a relay node only needs to execute LT with reference to only a target address.

(Operation of Second Exemplary Embodiment)

Description will be made of an LT execution method according to the present exemplary embodiment in a case of executing LT from the terminal T2 to the terminal T1 in the networks shown in FIG. 1 and FIG. 15 formed of the switches S1 through S8 having the foregoing described structure. Use of the method according to the present exemplary embodiment enables a transfer route to a target device to be confirmed, as well as a failing part to be specified after failure switching which is impossible in the related art.

Figure 13:
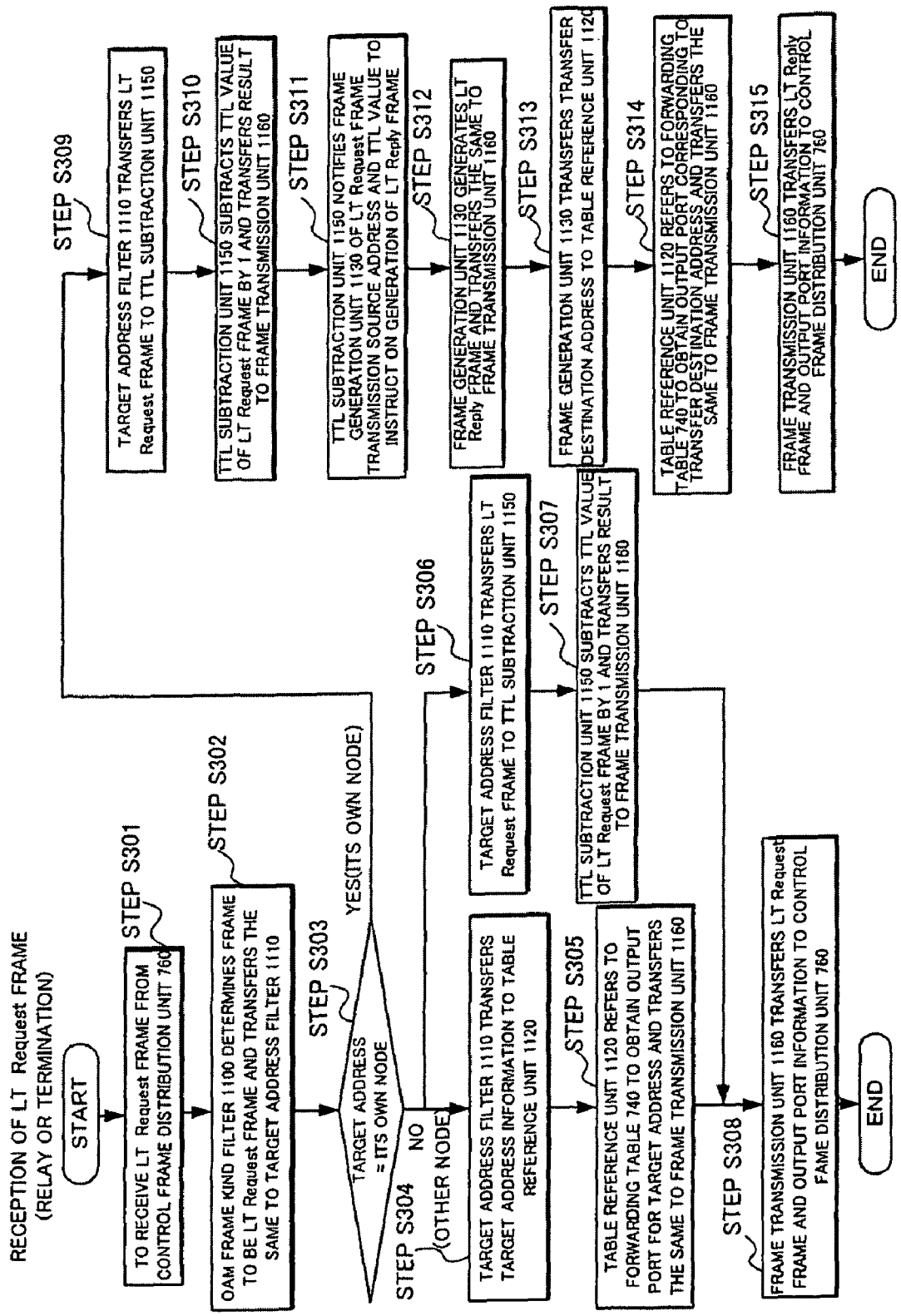
FIG. 13 is a processing flow at the time of receiving an LT Request frame by the OAM control unit according to the first exemplary embodiment.

Since the processing flows shown in FIG. 11 and FIG. 13 are partly changed with a partial change of the structures and the functions of the table reference unit 2220 and the frame generation unit 2230 of the OAM control unit 1970, the processing flows shown in FIG. 11 and FIG. 13 according to the second exemplary embodiment will be described mainly with respect to a difference from the first exemplary embodiment.

(Control in Case of Generating LT Request Frame from Own Node)

Parts to be changed of the processing flow of control executed when generating an LT Request frame from its own node shown in FIG. 11 are as follows.

At Step S101, an LT execution request received from the setting control unit 790 by the frame generation unit 2230 includes address information of a target device which executes LT.

The frame generation unit 2230 generates an LT Request frame based on target address information to transfer the generated LT Request frame to the frame transmission unit 1160 at Step S102.

The frame generation unit 2230 also transfers the target address information to the table reference unit 2220 at Step S103.

Thereafter, the table reference unit 2220 refers to the MAC table 2000 of the forwarding table 1940 to search for an entry having matching target address and obtains relevant output port information to transfer the same to the frame transmission unit 1160 at Step S104.

Thus, while in the first exemplary embodiment, information of the normal mode/failure switching mode is held as independent information, in the present exemplary embodiment, because mode information is included in target address information, only target address information is exchanged.

(Control in Case of Relaying LT Request Frame from Other Node, While Generating LT Reply Frame)

Next, a part to be changed in the processing flow of control is as follows in a case of relaying an LT Request frame from other node, as well as generating an LT Reply frame shown in FIG. 13.

As a result of the determination at Step S303, when the target address is that of other node, the target address filter 1110 transfers the target address information to the table reference unit 2220 at Step S304.

Thereafter at Step S305, the table reference unit 2220 refers to the MAC table 2000 of the forwarding table 1940 to search for an entry having matching target address information and obtains corresponding output port information.

Thus, similarly to the case shown in FIG. 11, while the information of the normal mode/failure switching mode is held as independent information in the first exemplary embodiment, only target address information is exchanged in the present exemplary embodiment because mode information is included in target address information.

Next, a setting example of the MAC table 2000 in a case where the present invention is used will be described.

Shown in FIG. 22 is the MAC table 2000 in a case where MAC address learning is completed in the normal state in the network shown in FIG. 1.

Here, with VLAN as X, a MAC address of the terminal T1 as 0x 00 00 4c 00 00 01 and a MAC address of the terminal T2 as 0x 00 00 4c 00 00 02, stored in the switches S1 through S8 are entries of MAC#0x 00 00 4c 00 00 01 and VLAN#X, and MAC#0x 00 00 4c 00 00 02 and VLAN#X.

Assume here that in the network shown in FIG. 1, there occurs a failure on the link between the switch S2 and the switch S3 as shown in FIG. 15. In such a case, BPDU is exchanged according to an STP/RSTP procedure to make the link between the switch S6 and the switch S7 be an active link, thereby restructuring topology.

Shown in FIG. 23 is a setting state of the MAC table 2000 in the course of this processing.

In FIG. 23, entries of the port p2 of the switch S2 and the port p1 of the switch S3 having sensed a failure are flushed.

In addition, as a characteristic of the present invention, an entry of a port having received a topology change message is not flushed, which is flushed in the related art, but the entry remains with a multicast bit (eighth bit) of a MAC address changed to the value of 1.

As one example, the port p2 of the switch S1 receives a topology change message from the switch S2 and at that time, an entry of MAC#0x 00 00 4c 00 00 02 and VLAN#X learned at the port p2 is not flushed but the entry remains with the multicast bit rewritten from 0 to 1 as an entry of MAC#0x 01 00 4c 00 00 02 and VLAN#X.

The same processing is executed with respect to an entry of MAC#0x 00 00 4c 00 00 01 and VLAN#X of the switch S4, an entry of MAC#0x 00 00 4c 00 00 01 and VLAN#X of the switch S5, entries of MAC#0X 00 00 4c 00 00 01 and VLAN#X, and MAC#0x 00 00 4c 00 00 02 and VLAN#X of the switch S6, entries of MAC#0x 00 00 4c 00 00 01 and VLAN#X, and MAC#0x 00 00 4c 00 00 02 and VLAN#X of the switch S7, and entries of MAC#0x 00 00 4c 00 00 01 and VLAN#X, and MAC#0x 00 00 4c 00 00 02 and VLAN#X of the switch S8, all of which remain as an entry whose multicast bit is 1, that is, 0x 01 00 4c 00 00 01 or 0x 01 00 4c 00 00 02.

Shown in FIG. 24 is a setting state of the MAC table 2000 as of after frame transfer is resumed thereafter in the network shown in FIG. 15.

A shown in FIG. 24, as a MAC address entry learned on new topology, stored in the MAC table 2000 of each node are MAC#0x 00 00 4c 00 00 01 and VLAN#X and MAC#0x 00 00 4c 00 00 02 and VLAN#X as an ordinary MAC address entry.

(Failing Part Specifying Processing)

Description will be made in the following of a case where LT in the failure switching mode with the devices from the terminal T2 to the terminal T1 as target devices is executed in the network shown in FIG. 15 when the MAC table is in such a state as shown in FIG. 24.

The terminal T2 as a transmission source transmits an LT Request frame (initial value of TTL is assumed to be 255). Here, because of LT in the failure switching mode, the target address of the terminal T1 will be 0x 01 00 4c 00 00 01.

The switch S5 having received the LT Request frame from the terminal T2 searches the MAC table 2000 shown in FIG. 24 for an entry having the address MAC#0x 01 00 4c 00 00 01 and VLAN#X of the terminal T1 as a target device.

The switch S5 obtains the port p2 as a result to transfer a Request frame whose TTL value is subtracted by 1 (TTL=254) to the port p2.

The switch S5 also returns an LT Reply frame with the TTL value of 254 stored to the terminal T2 as a Request issuing source device.

The switch S4 as a node at a subsequent stage on the side of the port p2 of the switch S5 searches the MAC table 2000 in FIG. 24 for an entry having the address MAC#0x 01 00 4c 00 00 01 and VLAN#X of the terminal T1 as a target device.

The switch S4 obtains the port p1 as a result to transfer a Request frame whose TTL value is subtracted by 1 (TTL=253) to the port p1.

The switch S4 also returns an LT Reply frame with the TTL value of 253 stored to the terminal T2 as a Request issuing source device.

The switch S3 as a node at a subsequent stage on the side of the port p1 of the switch S4 searches the MAC table 2000 in FIG. 24 for an entry having the address MAC#0x 01 00 4c 00 0.0 01 and VLAN#X of the terminal T1 as a target device.

As a result, since there exists no relevant entry, the switch S3 abandons the LT Request frame to return an LT Reply frame whose TTL value is subtracted by 1 (TTL value=252) to the terminal T2 as a Request issuing source device.

On the other hand, note the terminal T2 as an LT Request frame issuing source device, it receives the LT Reply frame (TTL=254) from the switch S5, the LT Reply frame (TTL 253) from the switch S4 and the LT Reply frame (TTL=252) from the switch S3.

Sorting the addresses to have TTL in descending order by the terminal T2 obtains the switch S5->the switch S4->the switch S3. As a result of timer expiration, if no other Reply frame than those described above are received at the terminal T2, this will be the result of LT.

Since this result fails to include the terminal T1 as a target device, it can be found that a failure occurs at a part before reaching the terminal T1 and it can be confirmed by the sorting result of the Reply frame that switches up to the switch S3 remain and some failure or other occurs on the route to follow.

Thus, even when LT is executed after failure switching is executed at failure occurrence, use of the method of the present embodiment enables LT to be executed on a route as of before switching to specify a failing part.

(Current Transfer Route Confirmation Processing)

As a matter of course, a current transfer route can be confirmed. Execution of LT in the normal mode with the devices between the terminal T2 and the terminal T1 in the network shown in FIG. 15 as target devices enables a current transfer route to be confirmed.

Because of the normal mode LT, the target address of the terminal T1 here will be 0x 00 00 4c 00 00 01. When the transmission source terminal T2 transmits an LT Request frame (the initial value of TTL is assumed to be 255), the switch S5 having received the LT Request frame searches the MAC table 2000 shown in FIG. 24 for an entry having the address MAC#0x 00 00 4c 00 00 01 and VLAN#X of the terminal T1 as a target device.

The switch S5 obtains the port p3 as a result to transfer a Request frame whose TTL value is subtracted by 1 (TTL=254) to the port p3.

The switch S5 also returns an LT Reply frame with the TTL value of 254 stored to the terminal T2 as a Request issuing source device.

Since the switch S6 as a node at a subsequent stage on the side of the port p3 of the switch S5 searches for an entry having the address MAC#0x 00 00 4c 00 00 01 and VLAN#X of the terminal T1 as a target device to obtain the port p1, it transfers a Request frame whose TTL value is subtracted by 1 (TTL=253) to the port p1.

The switch S6 also returns an LT Reply frame with the TTL value of 253 stored to the terminal T2 as a Request issuing source device.

Similarly, repeating the search of an entry having MAC#0x 00 00 4c 00 00 01 and VLAN#X, and the Request frame transfer processing and the Reply frame generation processing at each switch results in that LT Reply frames from the switch S7 (TTL=252), the switch S8 (TTL=251), the switch S1 (TTL=250) and the terminal T1 (TTL=249) arrive at the terminal T2.

Sorting the addresses to have TTL in descending order by the terminal T2 obtains the switch S5->the switch S6->the switch S7->the switch S8->the switch S1->the terminal T1.

As a result of timer expiration, if no other Reply frame than those described above are received at the terminal T2, this will be the result of LT to confirm the devices on a transfer route to the terminal T1 as a target device.

In the description made so far, a multicast bit (eighth-highest bit) of a MAC address is used as a bit for discrimination between the normal mode and the failure switching mode.

In a case where a MAC address can be set at will as in the MAC-in-MAC technique, the same effect can be obtained by assigning an arbitrary bit as a bit for mode identification.

Since when the highest-order bit is assigned as a bit for mode identification, for example, the MAC address of the terminal T1 as a target device in the above-described example will be MAC#0x 00 00 4c 00 00 01 in the normal mode and MAC#0x 80 00 4c 00 00 01 in the failure switching mode, the same effect can be obtained by changing the address in the failure switching mode in the above-described example from MAC#0x 01 00 4c 00 00 01 to MAC#0x 80 00 4c 00 00 01.

(Effects of Second Exemplary Embodiment)

As described in the foregoing, according to the use of the method of the present exemplary embodiment, when failure switching is executed at failure occurrence, not by flushing a MAC address entry as of before switching but replacing a part of bits of the MAC address to indicate an entry as of before switching, the MAC address entry as of before switching is held even after the failure switching.

Then, in a case of executing LT after failure switching at failure occurrence, by designating the normal mode for confirming a current transfer route or the failure switching mode for specifying a failing part at a time of making an LT request, LT is executed by using an address for the normal mode or an address for the failure switching mode as a target address.

As a result, when designating the failure switching mode, transferring an LT Request frame according to a MAC address entry as of before switching in the MAC table enables the LT Request frame to reach a node immediately preceding to the failure occurrence part and returning an LT Reply frame by each node enables a failing part to be specified.

(Third Exemplary Embodiment)

Other exemplary embodiment of the present invention will be described in detail with reference to the drawings.

(Structure of Third Exemplary Embodiment)

FIG. 25 shows a detailed structure of the frame switching unit 630 according to the third exemplary embodiment.

Shown in FIG. 25 is the frame switching unit 630 according to the second exemplary embodiment illustrated in FIG. 18, in which the OAM control unit 1970 is replaced by an OAM control unit 2670, the STP control unit 1980 by an STP control unit 2680 and the setting control unit 1990 by a setting control unit 2690. In the following, the present exemplary embodiment will be described mainly with respect to a difference from the second exemplary embodiment.

First, the STP control unit 2680 will be described.

The STP control unit 2680 has a function of executing the processing of STP/RSTP according to IEEE802.1D/w/s or the like similarly to the STP control unit 780 and the STP control unit 1980.

As characteristic processing of the present invention, the STP control unit 2680 has a function of, in addition to the ordinary STP/RSTP processing, converting, with respect to an address to be flushed when receiving a topology change message, a part of a VLAN tag in the MAC table 2000 without flushing.

More specifically, as shown in FIG. 26, the STP control unit 2680 has a function of converting, with respect to a Priority value (three bits) of an ordinary VLAN tag, an originally assigned Priority value into a reserved "010".

Priority value of an entry learned in the MAC table 2000 in the normal state, in a case of default, is "000" and in a case where all the Priority values corresponding to priorities are used conformed to IEEE802.1p, "000", "001", "011", "100", "101", "110" and "111" are used.

More specifically, since "010" is not used as a Priority value, in a case of the failure switching mode, the STP control unit 2680 changes the Priority value of the VLAN tag to "010" to allow the Priority value to be used for discrimination between the normal mode and the failure switching mode.

According to the present exemplary embodiment, this function enables an ordinary MAC address entry (VLAN tag Priority=originally assigned value) to be held similarly to the related art, as well as enabling a MAC address entry as of before switching (VLAN tag Priority=010) at the time of execution of failure switching to be held.

Subsequently, the OAM control unit 2670 will be described with reference to FIG. 27.

Figure 27:
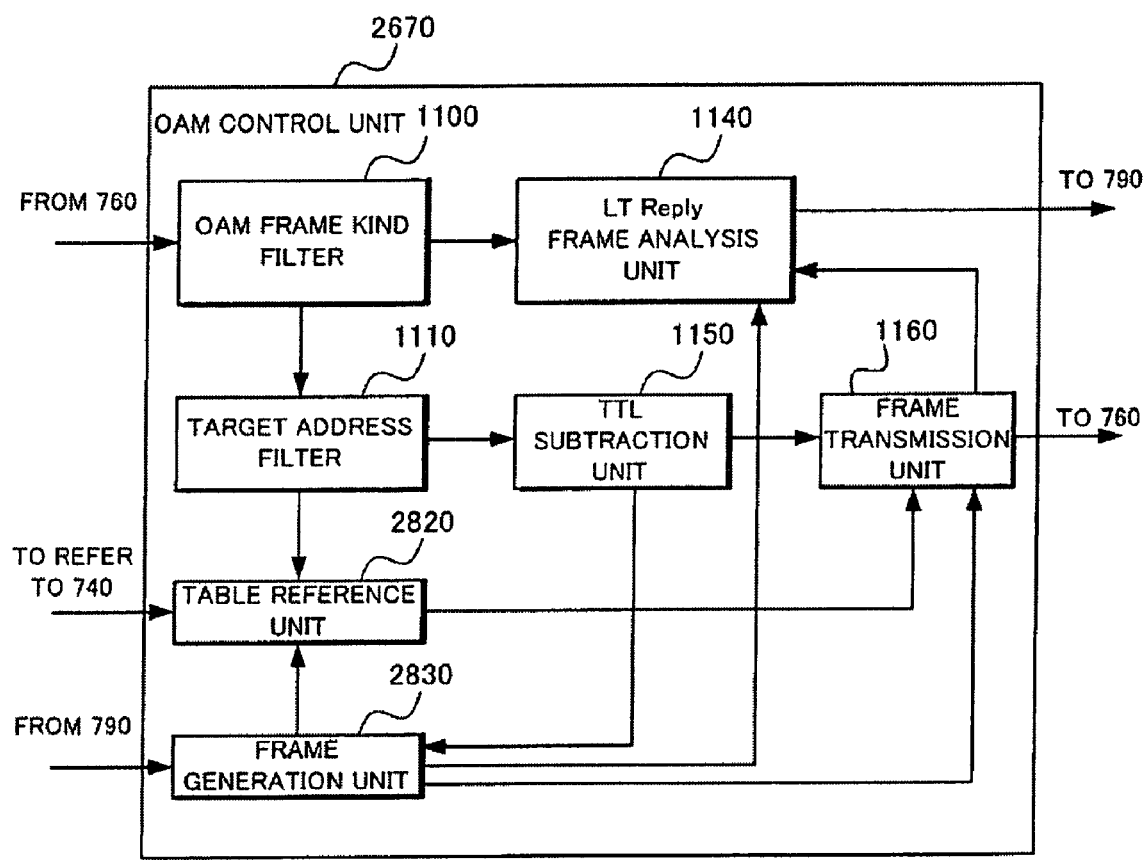
FIG. 27 is a diagram showing a structure of an OAM control unit according to the third exemplary embodiment.

As shown in FIG. 27, the OAM control unit 2670 has a frame generation unit 2830 replacing the frame generation unit 2230 of the OAM control unit 1970 and a table reference unit 2820 replacing the table reference unit 2220.

The function of the OAM control unit 2670 is substantially the same as the function of the OAM control unit 1970. Difference is that while the OAM control unit 1970 has the function of discriminating the normal mode and the failure switching mode by a multicast bit of a MAC address, the OAM control unit 2670 has a function of making the discrimination by a Priority value of a VLAN tag.

The frame generation unit 2830 has a function of receiving only target address information from the setting control unit 2690 to generate an LT Request frame.

In the present exemplary embodiment, when a VLAN tag Priority value of a target address is other value than "010", which indicates the normal mode, executing LT according to a MAC address learning condition at that time point enables a current transfer route to be confirmed, while when the VLAN tag Priority value of the target address is "010", which indicates the failure switching mode, executing LT according to a MAC address learning condition as of before execution of failure switching enables a failing part to be specified.

The table reference unit 2820 has a function of referring to the MAC table 2000 of the forwarding table 1940 to obtain output port information for target address information including mode information (mode information is included in a Priority field of a VLAN tag).

Lastly, the setting control unit 2690 will be described.

The setting control unit 1990 has the function of, at the time of notifying the OAM control unit 1970 of an LT execution request input through the console I/O, when an LT execution mode of the LT execution request is the normal mode, notifying the OAM control unit 1970 of a target address as it is, and when the LT execution mode of the LT execution request is the failure switching mode, notifying the OAM control unit 1970 of an address obtained by converting a multicast bit (eighth bit) of a target address into the value of 1.

On the other hand, the setting control unit 2670 has a function of, when an LT execution mode of the LT execution request is the normal mode, notifying the OAM control unit 2670 of a target address as it is similarly to the setting control unit 1970, and when the LT execution mode of the LT execution request is the failure switching mode, notifying the OAM control unit 2670 of a target address with a VLAN tag Priority value converted into "010".

(Operation of Third Exemplary Embodiment)

Description will be made of an LT execution method according to the present exemplary embodiment in a case of executing LT from the terminal T2 to the terminal T1 in the networks shown in FIG. 1 and FIG. 15 formed of the switches S1 through S8 having the foregoing described structure and functions. Use of the method according to the present exemplary embodiment enables a transfer route to a target device to be confirmed, as well as enabling a failing part to be specified after failure switching which is impossible in the related art.

First, a setting example of the MAC table 2000 in a case where the present invention is used will be described.

Shown in FIG. 28 is the MAC table 2000 in a case where MAC address learning is completed in the normal state in the network shown in FIG. 1.

Assume here that VLAN is "000" which is the default of a Priority value, a CFI value is 0 and VID is 0000 0000 0001. Description of TPID=0x8100 is omitted.

In addition, with the MAC address of the terminal T1 as t1 and the MAC address of the terminal T2 as t2, entries of MAC#t1 and VLAN#0000 0000 0000 0001 and MAC#t2 and VLAN#0000 0000 0000 0001 are stored in the switches S1 through S8.

Assume here that in the network shown in FIG. 1, there occurs a failure on the link between the switch S2 and the switch S3 as shown in FIG. 15. In such a case, BPDU is exchanged according to an STP/RSTP procedure to make the link between the switch S6 and the switch 37 be an active link, thereby restructuring topology. Shown in FIG. 29 is a setting state of the MAC table 2000 in the course of this processing.

In FIG. 29, entries of the port p2 of the switch S2 and the port p1 of the switch S3 having sensed a failure are flushed.

In addition, as a characteristic of the present invention, an entry of a port having received a topology change message is not flushed, which is flushed in the related art, but the entry remains with a VLAN tag Priority value changed from the originally set value "000" to "010".

As one example, the port p2 of the switch S1 receives a topology change message from the switch S2 and at that time, an entry of MAC#t2 and VLAN#0000 0000 0000 0001 learned at the port p2 is not flushed but the entry is left as an entry of MAC#t2 and VLAN#0100 0000 0000 0001 with the VLAN Priority value rewritten from "000" to "010".

The same processing is executed with respect to an entry of MAC#t1 and VLAN#0000 0000 0000 0001 of the switch S4, an entry of MAC#t1 and VLAN#0000 0000 0000 0001 of the switch S5, entries of MAC#t1 and VLAN#0000 0000 0000 0001 and MAC#t2 and VLAN#0000 0000 0000 0001 of the switch S6, entries of MAC#t1 and VLAN#0000 0000 0000 0001, and MAC#t2 and VLAN#0000 0000 0000 0001 of the switch S7, and entries of MAC#t1 and VLAN#0000 0000 0000 0001, and MAC#t2 and VLAN#0000 0000 0000 0001 of the switch S8, all of which remain as an entry whose VLAN Priority is 010, that is, VLAN#0100 0000 0000 0001.

Shown in FIG. 30 is a setting state of the MAC table 2000 as of after frame transfer is resumed in the network shown in FIG. 15.

As a MAC address entry learned on new topology, stored in the MAC table 2000 of each node are MAC#t1 and VLAN#0000 0000 0000 0001, and MAC#t2 and VLAN#0000 0000 0000 0001 as an ordinary MAC address entry.

(Failing Part Specifying Processing)

Description will be made in the following of a case where LT in the failure switching mode with the devices from the terminal T2 to the terminal T1 as target devices is executed in the network of FIG. 15 when the MAC table is in such a state as shown in FIG. 30.

The terminal T2 as a transmission source transmits an LT Request frame (initial value of TTL is assumed to be 255).

Here, because of LT in the failure switching mode, the target address of the terminal T1 will be MAC#t1 and VLAN#0100 0000 0000 0001.

The switch S5 having received the LT Request frame from the terminal T2 searches the MAC table 2000 shown in FIG. 30 for an entry having the address MAC#t1 and VLAN#0100 0000 0000 0001 of the terminal T1 as a target device.

The switch S5 obtains the port p2 as a result to transfer a Request frame whose TTL value is subtracted by 1 (TTL=254) to the port p2.

The switch S5 also returns an LT Reply frame with the TTL value of 254 stored to the terminal T2 as a Request issuing source device.

The switch S4 as a node at a subsequent stage on the side of the port p2 of the switch S5 searches the MAC table 2000 shown in FIG. 30 for an entry having the address MAC#t1 and VLAN#0100 0000 0000 0001 of the terminal T1 as a target device.

The switch S4 obtains the port p1 as a result to transfer a Request frame whose TTL value is subtracted by 1 (TTL=253) to the port p1.

The switch S4 also returns an LT Reply frame with the TTL value of 253 stored to the terminal T2 as a Request issuing source device.

The switch S3 as a node at a subsequent stage on the side of the port p1 of the switch S4 searches the MAC table 2000 shown in FIG. 30 for an entry having the address MAC#t1 and VLAN#0100 0000 0000 0001 of the terminal T1 as a target device.

As a result, since there exists no relevant entry, the switch S3 abandons the LT Request frame to return an LT Reply frame whose TTL value is subtracted by 1 (TTL value=252) to the terminal T2 as a Request issuing source device.

On the other hand, note the terminal T2 as an LT Request frame issuing source device, it receives the LT Reply frame (TTL=254) from the switch S5, the LT Reply frame (TTL=253) from the switch S4 and the LT Reply frame (TTL=252) from the switch S3.

Sorting the addresses to have TTL in descending order by the terminal T2 obtains the switch S5->the switch S4->the switch S3. As a result of timer expiration, if no other Reply frame than those described above are received at the terminal T2, this will be the result of LT.

Since this result fails to include the terminal T1 as a target device, it can be found that a failure occurs at a part before reaching the terminal T1 and it can be confirmed by the sorting result of the Reply frame that switches up to the switch S3 remain and some failure or other occurs on the route to follow.

Thus, even when LT is executed after failure switching is executed at failure occurrence, use of the method of the present embodiment enables LT to be executed on a route as of before switching to specify a failing part.

(Current Transfer Route Confirmation Processing)

As a matter of course, a current transfer route can be confirmed. Execution of LT in the normal mode with the terminal T1 as a target device enables the terminal T2 to confirm a current transfer route.

Because of the normal mode LT, the target address of the terminal T1 here will be MAC#t1 and VLAN#0000 0000 0000 0001. When the transmission source terminal T2 transmits an LT Request frame (the initial value of TTL is assumed to be 255), the switch S5 having received the LT Request frame searches the MAC table 2000 shown in FIG. 30 for an entry having the address of MAC#t1 and VLAN#0000 0000 0000 0001 of the terminal T1 as a target device.

The switch S5 obtains the port p3 as a result to transfer a Request frame whose TTL value is subtracted by 1 (TTL=254) to the port p3.

The switch S5 also returns an LT Reply frame with the TTL value of 254 stored to the terminal T2 as a Request issuing source device.

Since the switch S6 as a node at a subsequent stage on the side of the port p3 of the switch S5 searches for an entry having the address of MAC#t1 and VLAN#0000 0000 0000 0001 of the terminal T1 as a target device to obtain the port p1, it transfers a Request frame whose TTL value is subtracted by 1 (TTL=253) to the port p1.

The switch S6 also returns an LT Reply frame with the TTL value of 253 stored to the terminal T2 as a Request issuing source device.

Similarly, repeating the search of an entry having MAC#t1 and VLAN#0000 0000 0000 0001 and the Request frame transfer processing and the Reply frame generation processing at each switch results in that LT Reply frames from the switch S7 (TTL=252), the switch 38 (TTL=251), the switch S1 (TTL=250) and the terminal T1 (TTL=249) arrive at the terminal T2.

Sorting the addresses to have TTL in descending order by the terminal T2 obtains the switch S5->the switch S6->the switch S7->the switch S8->the switch S1->the terminal T1.

As a result of timer expiration, if no other Reply frame than those described above are received at the terminal T2, this will be the result of LT to confirm the devices on a transfer route to the terminal T1 as a target device.

(Effects of Third Exemplary Embodiment)

As described in the foregoing, according to the use of the method of the present exemplary embodiment, when failure switching is executed at failure occurrence, not by flushing a MAC address entry as of before switching but by replacing a part of bits of a VLAN tag to indicate an entry as of before switching, the MAC address entry as of before switching is held even after the failure switching.

Then, in a case of executing LT after failure switching at failure occurrence, by designating the normal mode for confirming a current transfer route or the failure switching mode for specifying a failing part at a time of making an LT request, LT is executed by using an address for the normal mode or an address for the failure switching mode as a target address.

As a result, when designating the failure switching mode, transferring an LT Request frame according to a MAC address entry as of before switching in the MAC table enables the LT Request frame to reach a node immediately preceding to the failure occurrence part and returning an LT Reply frame by each node enables a failing part to be specified.

(Fourth Exemplary Embodiment)

Fourth exemplary embodiment of the present invention will be described in detail with reference to the drawings.

(Structure Of Fourth Exemplary Embodiment)

Figure 31:
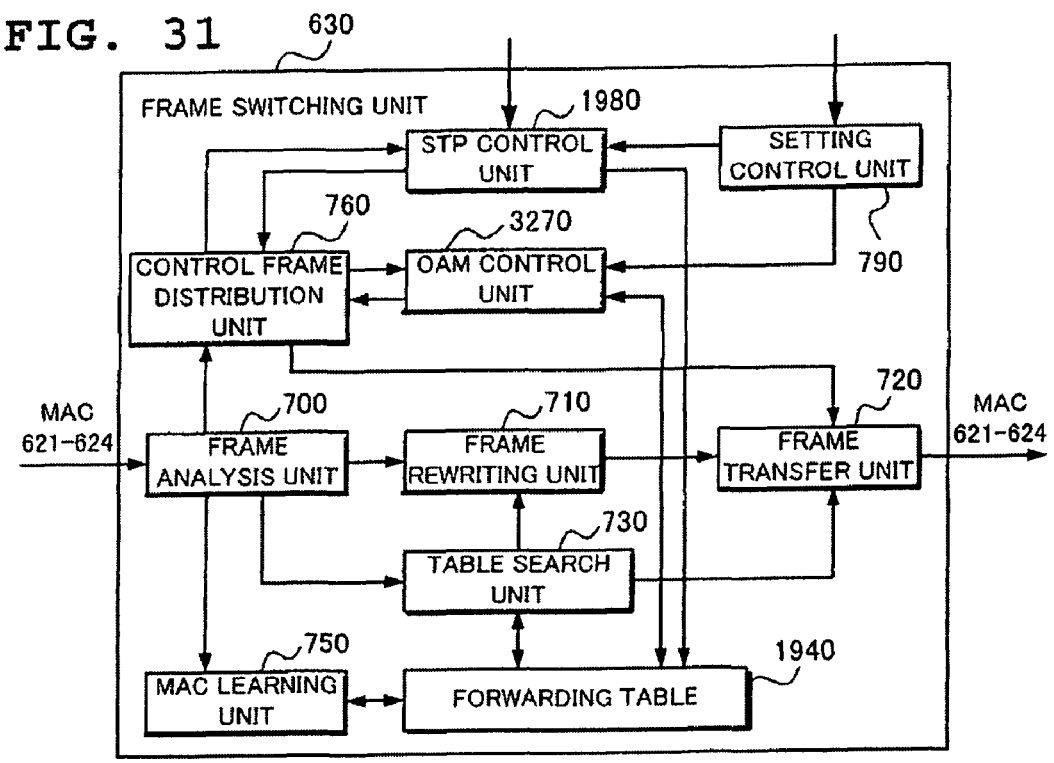
FIG. 31 is a diagram showing a structure of a frame switching unit according to a fourth exemplary embodiment of the present invention.

FIG. 31 shows a detailed structure of the frame switching unit 630 according to the fourth exemplary embodiment.

Shown in FIG. 31 is the frame switching unit 630 according to the second exemplary embodiment illustrated in FIG. 18, in which the OAM control unit 1970 is replaced by an OAM control unit 3270 and the setting control unit 1990 by the setting control unit 790 according to the first exemplary embodiment.

Difference of the present exemplary embodiment from the second exemplary embodiment is that while similarly to the second exemplary embodiment, discrimination between the normal mode and the failure switching mode is made by a multicast bit of an MAC address, the function of executing address conversion of a target address according to a mode is held not by the setting control unit 1990 as in the second exemplary embodiment but by the OAM control unit 3270.

In addition, while in the second exemplary embodiment, the setting control unit 1990 has the function of executing address conversion of a target address of an LT execution request and transferring the obtained request to the OAM control unit 1970, in the present exemplary embodiment, the setting control unit 1990 is replaced by the setting control unit 790 according to the first exemplary embodiment, which has a function of transferring mode information of an LT execution request to the OAM control unit 3270, and the OAM control unit 3270 has a function of generating an LT Request frame with mode information stored.

In the following, the present exemplary embodiment will be described mainly with respect to a difference from the second exemplary embodiment.

The OAM control unit 3270 will be described.

Figure 32:
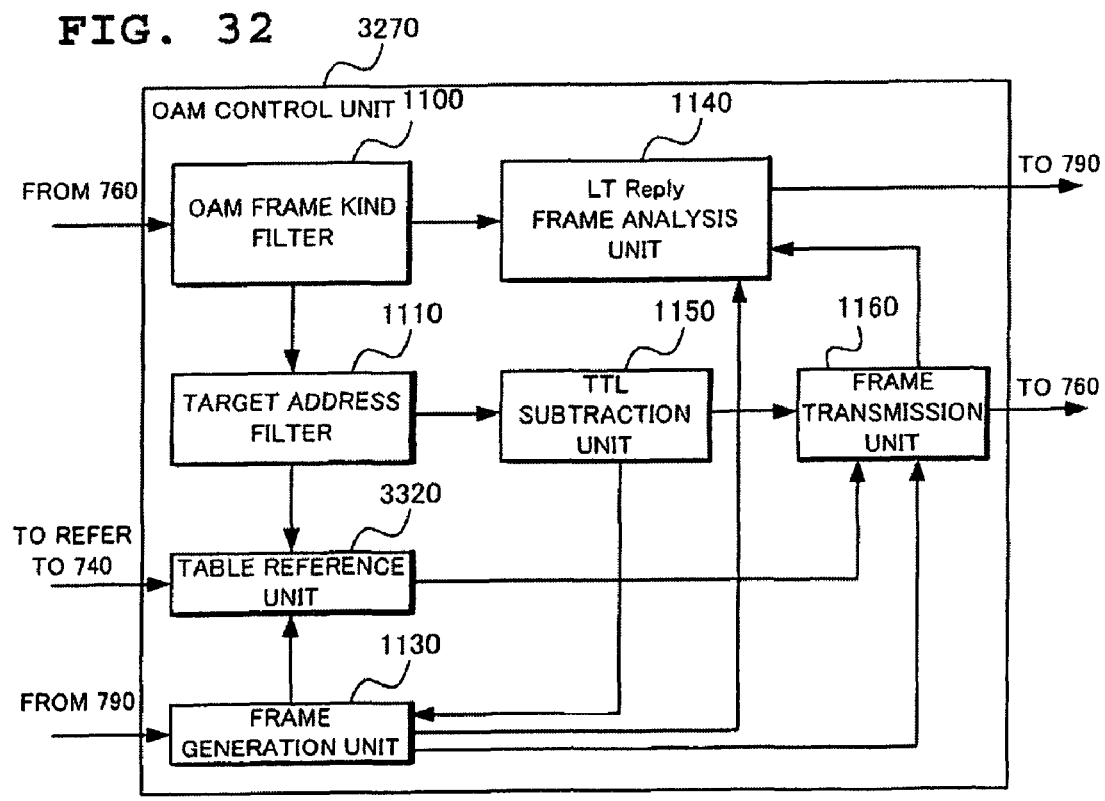
FIG. 32 is a diagram showing a structure of an OAM control unit according to the fourth exemplary embodiment.
Figure 33:
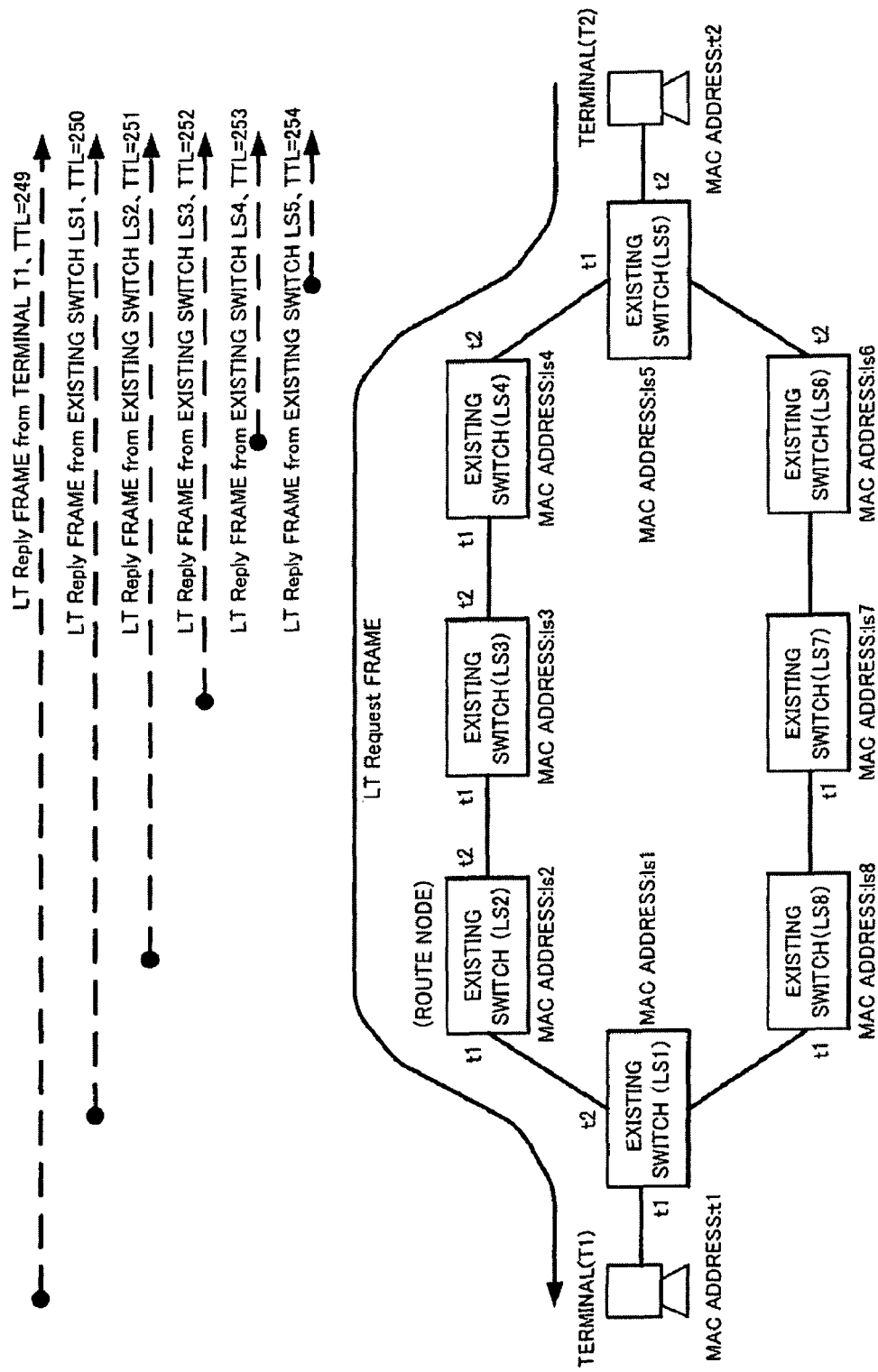
FIG. 33 is a diagram for use in explaining an LT technique in a related art Ethernet in a normal state.
Figure 34:
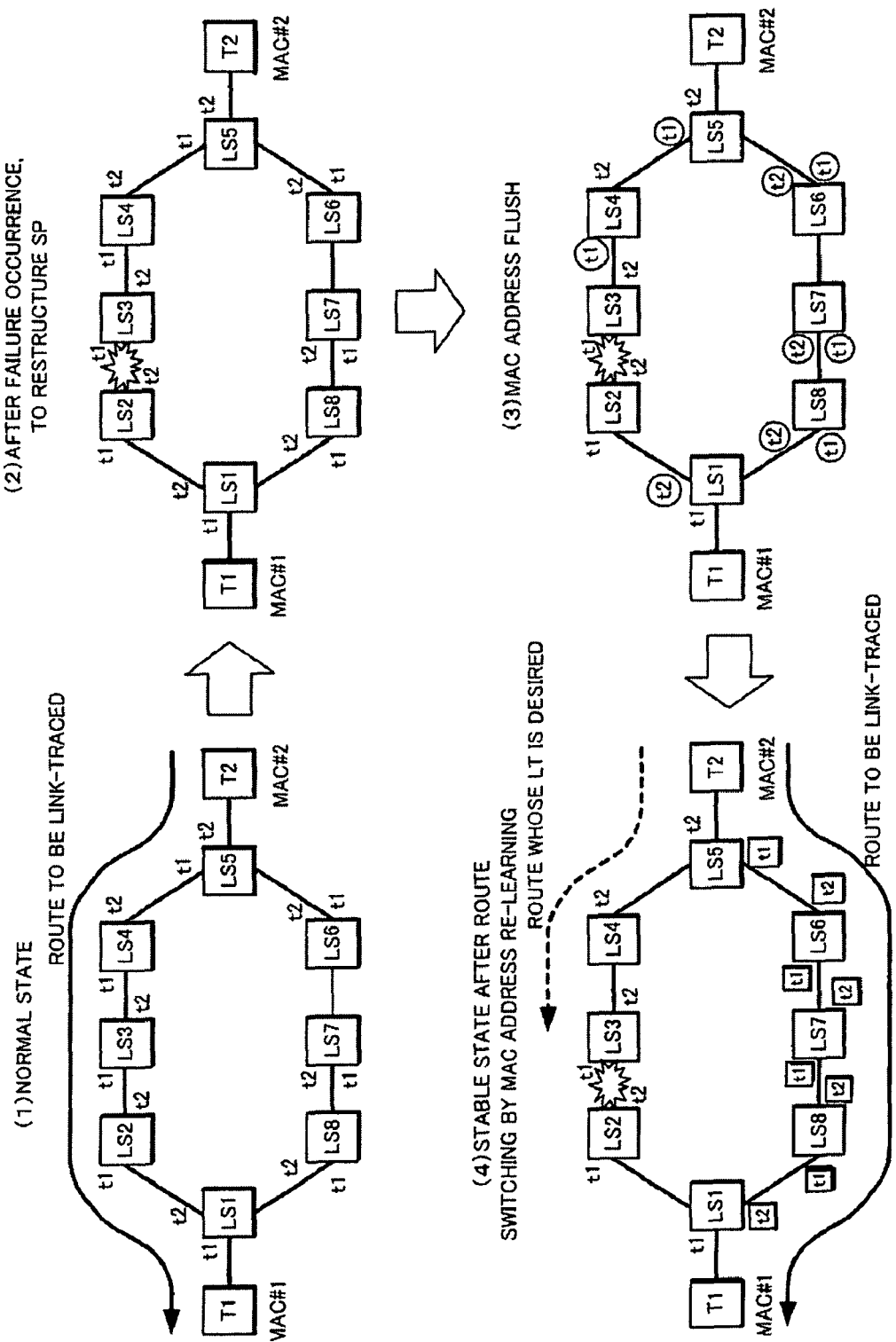
FIG. 34 is a diagram for use in explaining an LT technique in a related art Ethernet used at the time of failure.

Basic structure of the OAM control unit 3270 is the same as that of the OAM control unit 1970. As shown in FIG. 32, difference is that the table reference unit 2220 is replaced by a table reference unit 3320 and the frame generation unit 2230 is replaced by the frame generation unit 1130 according to the first exemplary embodiment.

Difference in the function is as follows.

The table reference unit 2220 has the function of referring to the MAC table 2000 of the forwarding table 1940 based on target address information including mode information received from the frame generation unit 2230 or the target address filter 1110 to obtain output port information corresponding to the target address information.

On the other hand, the table reference unit 3320 has a function of, upon receiving target address information and mode information of an LT Request frame from the frame generation unit 1130 or the target address filter 1110, converting the target address information based on the mode information and referring to the MAC table 2000 of the forwarding table 1940 based on the converted target address information to obtain the corresponding output port information.

Method of converting target address information according to mode information is the same as that executed by the setting control unit 1990 according to the second exemplary embodiment.

More specifically, when the mode information indicates the normal mode, a MAC address of a target is held as it is. On the other hand, when the mode information indicates the failure switching mode, a multicast bit (eighth highest bit) of the MAC address of the target is changed from the value of 0 to the value of 1.

The MAC table 2000 of the forwarding table 1940 is designed to have a MAC address entry of the normal mode and a MAC address entry of the failure switching mode both held by the STP control unit 1980, so that when the table reference unit 3320 searches the MAC table 2000 of the forwarding table 1940 by an address subjected to address conversion, an output port corresponding to the mode can be obtained.

(Operation of Fourth Exemplary Embodiment)

As a part of the structure and the functions of the table reference unit 3320 of the OAM control unit 3270 is changed, the processing flows shown in FIG. 11 and FIG. 13 will be changed.

(Control in Case of Generating LT Request Frame from Own Node)

Part to be changed in the processing flow of control executed in a case of generating an LT Request frame from its own node shown in FIG. 11 is Step S104.

At Step S104, while the table reference unit 1120 refers to the MAC table 800 of the forwarding table 740 to search for an entry having matching target address and mode information and obtain relevant output port information and transfers the same to the frame transmission unit 1160, the table reference unit 3320 converts a target address according to mode information and refers to the MAC table 2000 of the forwarding table 1940 based on the converted target address to obtain output port information and transfer the same to the frame transmission unit 1160.

(Control in Case of Relaying LT Request Frame from Other Node, as Well as Generating LT Reply Frame)

Next, a point to be changed in the processing flow of control executed in a case of relaying an LT Request frame from other node, as well as generating an LT Reply frame shown in FIG. 13 is Step S305. This is the same as the operation of the above-described Step S104.

At Step S305, the table reference unit 1120 refers to the MAC table 800 of the forwarding table 740 to search for an entry having matching target address and mode information and obtain corresponding output port information and transfers the information to the frame transmission unit 1160.

On the other hand, the table reference unit 3320 converts a target address according to mode information and refers to the MAC table 2000 of the forwarding table 1940 based on the converted target address to obtain output port information and transfer the same to the frame transmission unit 1160.

Since description of an LT execution example according to the present exemplary embodiment in a case of executing LT from the terminal T2 to the terminal T1 in the network shown in FIG. 1 formed of the switches S1 through S8 having the foregoing-described structure and functions is the same as that of the second exemplary embodiment made with reference to FIG. 22 through FIG. 24, it will not be repeated here.

In the present exemplary embodiment, the address conversion method based on mode information has been described with the method using a multicast bit of a MAC address of a target address according to the second exemplary embodiment applied.

As to an address conversion method, also applicable is the method using a Priority bit of a VLAN tag of a target address which has been described in the third exemplary embodiment. In this case, the STP control unit 1970 shown in FIG. 31 is replaced by the STP control unit 2670 according to the third exemplary embodiment.

The address conversion method of the table reference unit 3320 shown in FIG. 32 is not to convert a multicast bit according to mode information but when mode information indicates the normal mode, to hold a target address as it is and when the mode information indicates the failure switching mode, to convert a VLAN tag Priority value of the target address to "010", so that address conversion according to mode information is executed by the OAM control unit of each node in the network, not by a setting control unit of an LT Request frame issuing node as described in the present exemplary embodiment, thereby enabling execution of LT for specifying a failing part at failure occurrence.

(Effects of Fourth Exemplary Embodiment)

As described in the foregoing, according to the use of the method of the present exemplary embodiment, when failure switching is executed at failure occurrence, not by flushing a MAC address entry as of before switching but replacing a part of bits of the MAC address to indicate an entry as of before switching, the MAC address entry as of before switching is held even after the failure switching.

Then, in a case of execution of LT after failure switching at failure occurrence, by designating the normal mode for confirming a current transfer route or the failure switching mode for specifying a failing part at a time of making an LT request, LT is executed by using an address for the normal mode or an address for the failure switching mode as a target address.

As a result, when designating the failure switching mode, transferring an LT Request frame according to a MAC address entry as of before switching in the MAC table enables the LT Request frame to reach a node immediately preceding to a failure occurrence part and returning an LT Reply frame at each node enables a failing part to be specified.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Incorporation by Reference

This application is based upon and claims the benefit of priority from Japanese patent application No. 2006-084761, filed on Mar. 27, 2006, the disclosure of which is incorporated herein in its entirety by reference.

What is claimed is:

1. A frame transfer route confirmation method of a network for transferring a data frame transmitted from a transmission source terminal to a destination terminal, comprising the steps of:
   when changing a network structure, applying identification information, by a hardware node, to an address whose output destination is to be changed in a forwarding table to leave said address; and
   transferring, by the hardware node, said request message based on an ordinary address to confirm a route or transferring the message based on the address left with said identification information applied to confirm a route,
   wherein when applying identification information to an address whose output destination is to be changed in said forwarding table to leave said address,
   with said forwarding table provided with a flag field indicative of before network structure change and after change, a value of a flag is changed to on at the time of changing the network structure, and
   with said flag information stored in said request message, a route confirmed by designating whether transfer is made according to an ordinary address or transfer is made according to the address left with said identification information applied.

2. The frame transfer route confirmation method according to claim 1, wherein said network is a network in which a node transmits a request message having the number of hops stored to a target node, a relay node and said target node return a reply message with said number of hops subtracted to a transmission source node of said request message and said transmission source node rearranges said reply messages according to said number of hops, thereby obtaining information about nodes passed through from said transmission source node to said target node.

3. The frame transfer route confirmation method according to claim 1, wherein said network is a network in which a node transmits a request message having the number of hops stored to a target node, a relay node transfers said request message with said number of hops subtracted to said target node, as well as returning a reply message with said number of hops subtracted to a transmission source node of said request message, said target node returns a reply message with said number of hops subtracted to said transmission source node and said transmission source node rearranges said reply messages according to said number of hops of said reply messages in descending order or ascending order, thereby obtaining information about nodes passed through from said transmission source node to said target node by transmission source addresses of said reply messages.

4. The frame transfer route confirmation method according to claim 1, wherein when applying identification information to an address whose output destination is to be changed in said forwarding table to leave said address,
   in said forwarding table, an address is converted at the time of changing the network structure with a part of bits of the address used as a bit for the discrimination between before network structure change and after change, and
   with an ordinary address or a converted address stored in said request message, a route is confirmed by designating whether transfer is made according to an ordinary address or transfer is made according to said converted address.

5. The frame transfer route confirmation method according to claim 4, wherein in said forwarding table, address conversion is executed at the time of network structure change with an arbitrary bit of a MAC address of said target node used as a bit for discrimination between before network structure change and after change.

6. The frame transfer route confirmation method according to claim 5, wherein in said forwarding table, address conversion is executed at the time of network structure change with an eighth-highest order bit, which is a multicast bit, of a MAC address of said target node used as a bit for discrimination between before network structure change and after change.

7. The frame transfer route confirmation method according to claim 4, wherein in said forwarding table, address conversion is executed at the time of network structure change with an arbitrary bit of a VLAN tag of said target node used as a bit for discrimination between before network structure change and after change.

8. The frame transfer route confirmation method according to claim 7, wherein in said forwarding table, address conversion is executed at the time of network structure change with a Priority bit of a VLAN tag of said target node used as a bit for discrimination between before network structure change and after change.

9. The frame transfer route confirmation method according to claim 8, wherein in said forwarding table, with a Priority bit of a VLAN tag of said target node used as a bit for discrimination between before network structure change and after change, a Priority value assigned when in address conversion at the time of network structure change is converted to "010".

10. The frame transfer route confirmation method according to claim 1, wherein when applying identification information to an address whose output destination is to be changed in said forwarding table to leave said address,
    in said forwarding table, an address is converted at the time of changing the network structure with a part of bits of the address used as a bit for the discrimination between before network structure change and after change, and
    with said flag information stored in said request message, whether transfer is made according to an ordinary address or transfer is made according to the address left with said identification information applied is designated to confirm a route and when transfer is to be made according to the address left with said identification information applied, said request message is transferred according to an address subjected to address conversion at each said relay node to confirm a route.

11. A node on a network for transferring a data frame transmitted from a transmission source terminal to a destination terminal, comprising:
    a processor; and,
    a memory,
    wherein said memory stores a forwarding table for holding an output port for an address of said data frame;
    wherein said processor executes:
       a table rewriting processing unit for, at the time of changing a network structure, applying identification information to an address whose output destination is to be changed in said forwarding table to leave said address; and
       a maintenance control unit for, at the time of transferring said request message with the number of hops subtracted to a target node, transferring said request message based on an ordinary address or transferring the message based on the address left with said identification information applied, wherein
    said forwarding table further holds flag information indicative of before network structure change and after change, and said table rewriting processing unit at the time of network structure change, changes said flag information of an address whose output destination is to be changed in said forwarding table to leave said address, and which further comprises a setting control unit for issuing a frame transfer route confirmation request including said flag information to said maintenance control unit, and wherein said maintenance control unit, at the time of transferring said resquest message with said number of hops subtracted to said target node, transfers said request message according on an ordinary address as of after the network structure change or transfers the message according to an address as of before the network structure change whose said flag information is on.

12. The node according to claim 11, wherein said maintenance control unit generates a request message having said number of hops stored and transmits the message to a target node, transfers said request message with said number of hops subtracted to said target node and returns a reply message with said number of hops subtracted to a transmission source node of said request message and when receiving said reply message, rearranges said reply messages according to said number of hops in descending order or ascending order to obtain information about nodes passed through from said transmission source node to said target node by transmission source addresses of said reply messages.

13. The node according to claim 11, wherein at the time of changing the network structure, said table rewriting processing unit executes address conversion with respect to an address whose output destination is to be changed in said forwarding table, with a part of bits of said address used as a bit for the discrimination between before network structure change and after change, and which comprises a setting control unit for issuing, to said maintenance control unit, a frame transfer route confirmation request with an ordinary address as a target address when confirming a route after the network structure change and a frame transfer route confirmation request with said converted address as a target address when confirming a route before the network structure change, and wherein said maintenance control unit, at the time of transferring said request message with said number of hops subtracted to said target node, transfers the message according to an ordinary address as of after the network structure change which is stored in said request message or transfers the message according to a converted address as of before the network structure change which is stored in said request message.

14. The node according to claim 13, wherein when said table rewriting processing unit executes address conversion with a part of bits of an address used as a bit for the discrimination between before network structure change and after change in said forwarding table at the time of network structure change, a part of bits of said address is an arbitrary bit of a MAC address of said target node.

15. The node according to claim 14, wherein when said table rewriting processing unit executes address conversion with a part of bits of an address used as a bit for the discrimination between before network structure change and after change in said forwarding table at the time of network structure change, a part of bits of said address is an eight-highest order bit, a multicast bit, of a MAC address of said target node.

16. The node according to claim 13, wherein when said table rewriting processing unit executes address conversion with a part of bits of an address used as a bit for the discrimination between before network structure change and after change in said forwarding table at the time of network structure change, a part of bits of said address is an arbitrary bit of a VLAN tag of said target node.

17. The node according to claim 16, wherein when said table rewriting processing unit executes address conversion with a part of bits of an address used as a bit for the discrimination between before network structure change and after change in said forwarding table at the time of network structure change, a part of bits of said address is a Priority bit of a VLAN tag of said target node.

18. The node according to claim 17, wherein when said table rewriting processing unit executes address conversion with a part of bits of an address used as a bit for the discrimination between before network structure change and after change in said forwarding table at the time of network structure change, with a part of bits of said address as a Priority bit of a VLAN tag of said target node, a Priority value assigned at the time of address conversion is converted to "010".

19. The node according to claim 11, wherein at the time of changing the network structure, said table rewriting processing unit executes address conversion with respect to an address whose output destination is to be changed in said forwarding table, with a part of bits of said address used as a bit for the discrimination between before network structure change and after change, and which comprises a setting control unit for issuing a frame transfer route confirmation request including said flag information indicative of before network structure change and after change to said maintenance control unit, and wherein said maintenance control unit, at the time of transferring said request message with said number of hops subtracted to said target node, when said flag information stored in said request message is off, transfers the message according to an ordinary address as of after the network structure change and when said flag information stored in said request message is on, executes said address conversion to transfer the message according to the converted address.

20. The node according to claim 11, wherein said frame is an Ethernet frame and said address is a MAC address or a VLAN tag.

21. A non-transitory computer-readable data storage medium having a frame transfer route confirmation program executed by a node on a network for transferring a data frame transmitted from a transmission source terminal to a destination terminal, the program causing the node to execute a function comprising:

a table rewriting function of, at the time of changing a network structure, applying identification information to an address whose output destination is to be changed in said forwarding table holding an output port for said address of said data frame to leave said address; and a maintenance controlling function of, at the time of transferring said request message with the number of hops subtracted to a target node, transferring said request message based on an ordinary address or transferring the message based on the address left with said identification information applied, wherein at the time of changing the network structure, said table rewriting processing function executes address conversion with respect to an address whose output destination is to be changed in said forwarding table, with a part of bits of said address used as a bit for the discrimination between before network structure change and after change, and which causes said node to have a setting control function of issuing, to said maintenance control function, a frame transfer route confirmation request with an ordinary address as a target address when confirming a route after the network structure change and a frame transfer route confirmation request with said converted address as a target address when confirming a route before the network structure change, and wherein said maintenance control function, at the time of transferring said request message with said number of hops subtracted to said tar et node transfers the message according to an ordinary address as of after the network structure change which is stored in said request message or transfers the message according to a converted address as of before the network structure change which is stored in said request message.

22. The non-transitory computer-readable data storage medium according to claim 21, wherein at the time of changing the network structure, said table rewriting processing function executes address conversion with respect to an address whose output destination is to be changed in said forwarding table, with a part of bits of said address used as a bit for the discrimination between before network structure change and after change, and which causes said node to have a setting control function of issuing a frame transfer route confirmation request including said flag information indicative of before network structure change and after change to said maintenance control function, and wherein said maintenance control function, at the time of transferring said request message with said number of hops subtracted to said target node, when said flag information stored in said request message is off, transfers the message according to an ordinary address as of after the network structure change and when said flag information stored in said request message is on, executes said address conversion to transfer the message according to the converted address.

23. The non-transitory computer-readable data storage medium according to claim 21, wherein said table rewriting processing function executes address conversion with an arbitrary bit of a MAC address of said target node used as a bit for the discrimination between before network structure change and after change in said forwarding table at the time of network structure change.

24. The non-transitory computer-readable data storage medium according to claim 23, wherein said table rewriting processing function executes address conversion with an eight-highest order bit, which is a multicast bit, of a MAC address of said target node used as a bit for the discrimination between before network structure change and after change in said forwarding table at the time of network structure change.

25. The non-transitory computer-readable data storage medium according to claim 21, wherein said table rewriting processing function executes address conversion with an arbitrary bit of a VLAN tag of said target node used as a bit for the discrimination between before network structure change and after change in said forwarding table at the time of network structure change.

26. The non-transitory computer-readable data storage medium according to claim 25, wherein said table rewriting processing function executes address conversion with a Priority bit of a VLAN tag of said target node used as a bit for the discrimination between before network structure change and after change in said forwarding table at the time of network structure change.

27. The non-transitory computer-readable data storage medium according to claim 26, wherein said table rewriting processing function converts a Priority value assigned when in address conversion at the time of network structure change to "010", with a Priority bit of a VLAN tag of said target node used as a bit for the discrimination between before network structure change and after change in said forwarding table.

28. The non-transitory computer-readable data storage medium according to claim 21, wherein said maintenance control function generates a request message having the number of hops stored and transmits the message to a target node, transfers said request message with said number of hops subtracted to said target node and returns a reply message with said number of hops subtracted to a transmission source node of said request message and when receiving said reply message, rearranges said reply messages according to said number of hops in descending order or ascending order to obtain information about nodes passed through from said transmission source node to said target node by transmission source addresses of said reply messages.

29. A non-transitory computer-readable data storage medium storing a frame transfer route confirmation program executed by a node on a network for transferring a data frame transmitted from a transmission source terminal to a destination terminal, the program causing the node to execute a function comprising:

a table rewriting processing function of, at the time of changing a network structure, with respect to an address whose output destination is to be changed in a forwarding table which holds an output port for said address of said data frame and flag information indicative of before network structure change and after change, changing said flag information to leave said address;

a setting control function of issuing a frame transfer route confirmation request including said flag information; and a maintenance control function of receiving said frame transfer route confirmation request and at the time of transferring said request message with said number of hops subtracted to a target node, transferring said request message based on an ordinary address as of after the network structure change or transferring the message based on an address as of before the network structure change whose said flag information is on.

30. A frame transfer route confirmation system of a network for transferring a data frame transmitted from a transmission source terminal to a destination terminal, comprising:

a hardware node, wherein when changing a network structure, identification information is applied by the hardware node to an address whose output destination is to be changed in a forwarding table to leave said address, wherein said request message is transferred by the hardware node based on an ordinary address to confirm a route or transferred based on the address left with said identification information applied to confirm a route, and wherein when applying identification information to an address whose output destination is to be changed in said forwarding table to leave said address, with said forwarding table provided with a flag field indicative of before network structure change and after change, a value of a flag is changed to on at the time of changing the network structure, and with said flag information stored in said request message, a route is confirmed by designating whether transfer is made according to an ordinary address or transfer is made according to the address left with said identification information applied.

31. The frame transfer route confirmation system according to claim 30, wherein said network is a network in which a node transmits a request message having the number of hops stored to a target node, a relay node and said target node return a reply message with said number of hops subtracted to a transmission source node of said request message and said transmission source node rearranges said reply messages according to said number of hops, thereby obtaining information about nodes passed through from said transmission source node to said target node.

32. The frame transfer route confirmation system according to claim 30, wherein said network is a network in which a node transmits a request message having the number of hops stored to a target node, a relay node transfers said request message with said number of hops subtracted to said target node, as well as returning a reply message with said number of hops subtracted to a transmission source node of said request message, said target node returns a reply message with said number of hops subtracted to said transmission source node and said transmission source node rearranges said reply messages according to said number of hops of said reply messages in descending order or ascending order, thereby obtaining information about nodes passed through from said transmission source node to said target node by transmission source addresses of said reply messages.

33. The frame transfer route confirmation system according to claim 30, wherein when applying identification information to an address whose output destination is to be changed in said forwarding table to leave said address,
    in said forwarding table, an address is converted at the time of changing the network structure with a part of bits of the address used as a bit for the discrimination between before network structure change and after change, and
    with an ordinary address or a converted address stored in said request message, a route is confirmed by designating whether transfer is made according to an ordinary address or transfer is made according to said converted address.

34. The frame transfer route confirmation system according to claim 33, wherein when in said forwarding table, address conversion is executed at the time of network structure change with a part of bits of an address used as a bit for discrimination between before network structure change and after change, the part of bits of said address is an arbitrary bit of a MAC address of said target node.

35. The frame transfer route confirmation system according to claim 34, wherein when in said forwarding table, address conversion is executed at the time of network structure change with a part of bits of an address used as a bit for discrimination between before network structure change and after change, the part of bits of said address is an eighth-highest order bit, which is a multicast bit, of a MAC address of said target node.

36. The frame transfer route confirmation system according to claim 33, wherein when in said forwarding table, address conversion is executed at the time of network structure change with a part of bits of an address used as a bit for discrimination between before network structure change and after change, the part of bits of said address is an arbitrary bit of a VLAN tag of said target node.

37. The frame transfer route confirmation system according to claim 36, wherein when in said forwarding table, address conversion is executed at the time of network structure change with a part of bits of an address used as a bit for discrimination between before network structure change and after change, the part of bits of said address is a Priority bit of a VLAN tag of said target node.

38. The frame transfer route confirmation system according to claim 37, wherein when in said forwarding table, address conversion is executed at the time of network structure change with a part of bits of an address used as a bit for discrimination between before network structure change and after change, a Priority value assigned at the time of address conversion is converted to "010", with the part of bits of said address as a Priority bit of a VLAN tag of said target node.

39. The frame transfer route confirmation system according to claim 30, wherein when applying identification information to an address whose output destination is to be changed in said forwarding table to leave said address,
    in said forwarding table, an address is converted at the time of changing the network structure with a part of bits of the address used as a bit for the discrimination between before network structure change and after change, and
    with said flag information stored in said request message, whether transfer is made according to an ordinary address or transfer is made according to the address left with said identification information applied is designated to confirm a route, and when transfer is to be made according to the address left with said identification information applied, said request message is transferred according to an address subjected to address conversion at each said relay node to confirm a route.

40. The frame transfer route confirmation system according to claim 30, wherein said frame is an Ethernet frame and said address is a MAC address or a VLAN tag.

* * * * *